(12) United States Patent
Levy et al.

(10) Patent No.: US 12,411,105 B2
(45) Date of Patent: Sep. 9, 2025

(54) SEMICONDUCTOR STRUCTURE WITH FRONTSIDE PORT AND CAVITY FEATURES FOR CONVEYING SAMPLE TO SENSING ELEMENT

(71) Applicant: GlobalFoundries U.S. Inc., Malta, NY (US)

(72) Inventors: Mark D. Levy, Williston, VT (US); Siva P. Adusumilli, South Burlington, VT (US); Laura J. Silverstein, Richmond, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 536 days.

(21) Appl. No.: 17/821,836

(22) Filed: Aug. 24, 2022

(65) Prior Publication Data

US 2024/0068985 A1 Feb. 29, 2024

(51) Int. Cl.
*G01N 27/414* (2006.01)
*B01L 3/00* (2006.01)
*G01N 21/05* (2006.01)

(52) U.S. Cl.
CPC .... *G01N 27/4145* (2013.01); *B01L 3/502715* (2013.01); *G01N 21/05* (2013.01); *B01L 2300/047* (2013.01); *B01L 2300/0636* (2013.01); *B01L 2300/0645* (2013.01)

(58) Field of Classification Search
CPC ............ G01N 27/4145; G01N 21/05; B01L 3/502715; B01L 2300/047; B01L 2300/0636; B01L 2300/0645; G01L 2300/047
See application file for complete search history.

(56) References Cited

U.S. PATENT DOCUMENTS

| | | |
|---|---|---|
| 6,992,367 B2 | 1/2006 | Erratico et al. |
| 9,140,663 B2 | 9/2015 | Toumazou et al. |
| 9,991,200 B2 | 6/2018 | Ting et al. |
| 10,157,777 B2 | 12/2018 | He et al. |
| 10,649,145 B2 | 5/2020 | Cai |

(Continued)

OTHER PUBLICATIONS

Howe, "Recent Advances in Surface Micromachining," T. IEE Japan, vol. 116-E, No. 9, '96, pp. 90-96.

*Primary Examiner* — Christine S. Kim
*Assistant Examiner* — Andrew Victor Prostor
(74) *Attorney, Agent, or Firm* — Francois Pagette; Hoffman Warnick LLC

(57) ABSTRACT

A structure includes a lab-on-chip (LOC) sensor and frontside port and cavity features for conveying a flowable sample (fluid or gas) to a sensing element of the sensor. The cavity is confined within middle of the line (MOL) dielectric layer(s). Alternatively, the cavity includes a lower section within MOL dielectric layer(s), an upper section within back end of the line (BEOL) dielectric layer(s) in the first metal (M1) level, a divider between the sections, and a duct linking the sections. Alternatively, the cavity includes a lower portion within MOL dielectric layer(s) and an upper portion continuous with the lower portion and within BEOL dielectric layer(s) in the M1 level. Optionally, the cavity is separated from the sensing element by an additional dielectric layer and/or at least partially lined with a dielectric liner. The port extends from the top of the BEOL dielectric layers down to the cavity.

20 Claims, 29 Drawing Sheets

(56) References Cited

U.S. PATENT DOCUMENTS

| | | |
|---|---|---|
| 11,016,055 B2 | 5/2021 | Campanella-Pineda et al. |
| 2005/0156584 A1 | 7/2005 | Feng |
| 2017/0330790 A1* | 11/2017 | He .......................... H01L 23/66 |
| 2022/0404551 A1* | 12/2022 | Tadayon .............. H05K 1/0274 |
| 2023/0324332 A1* | 10/2023 | Levy .................. G01N 27/4148 |
| | | 257/253 |
| 2023/0420596 A1* | 12/2023 | Ellis-Monaghan .......................... |
| | | H10F 77/1223 |

\* cited by examiner

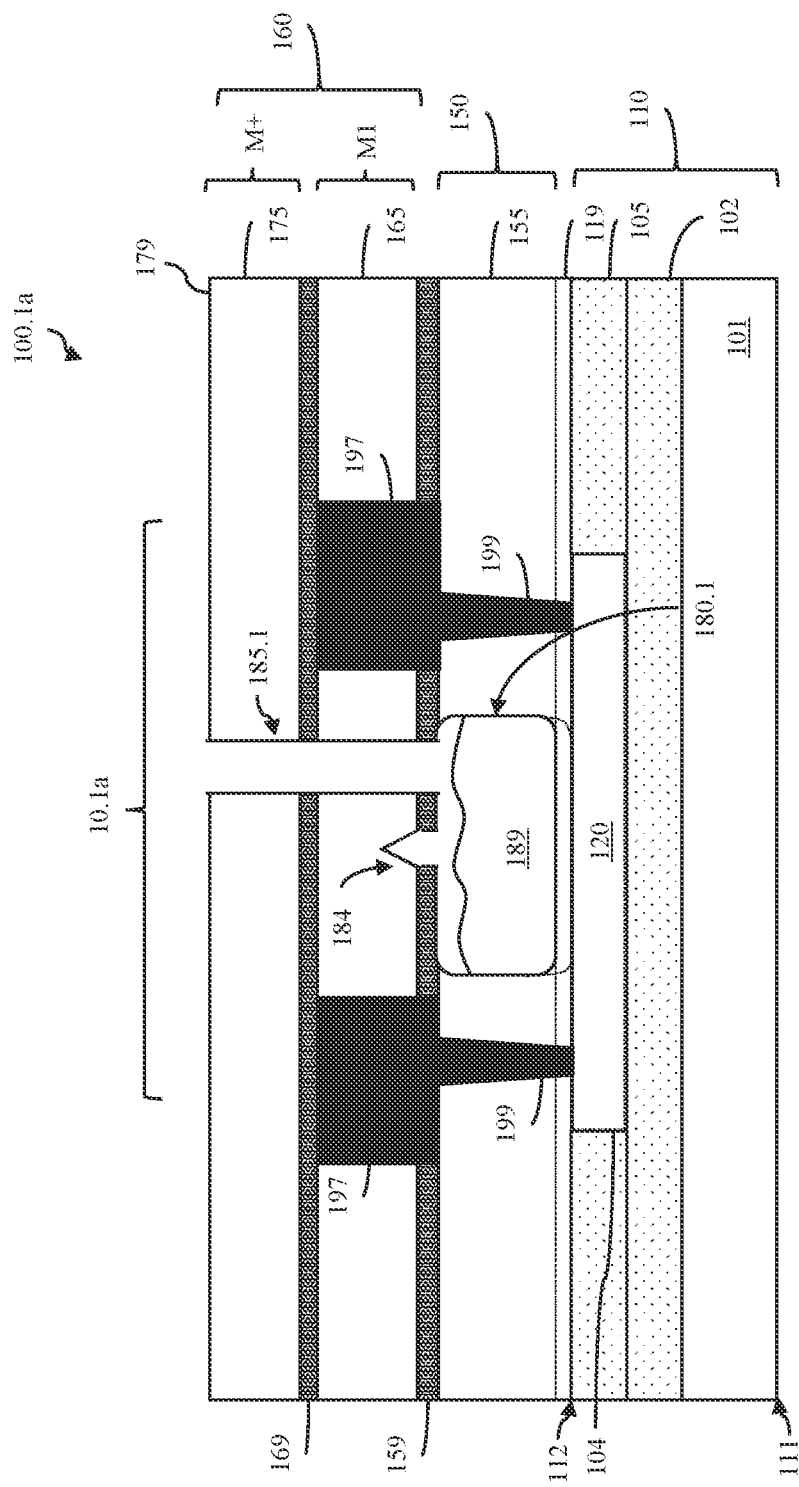
FIG. 1.1a

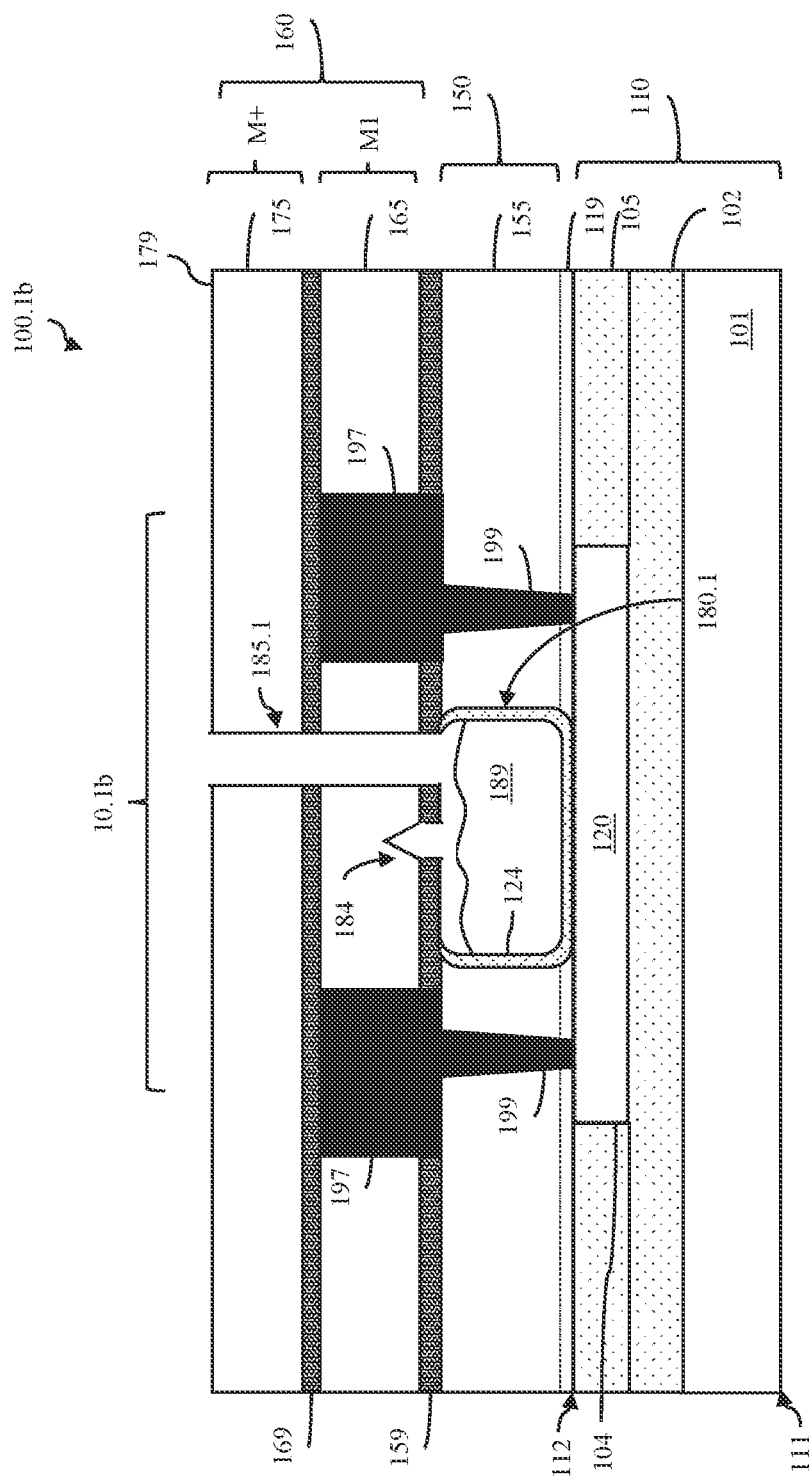
FIG. 1.1b

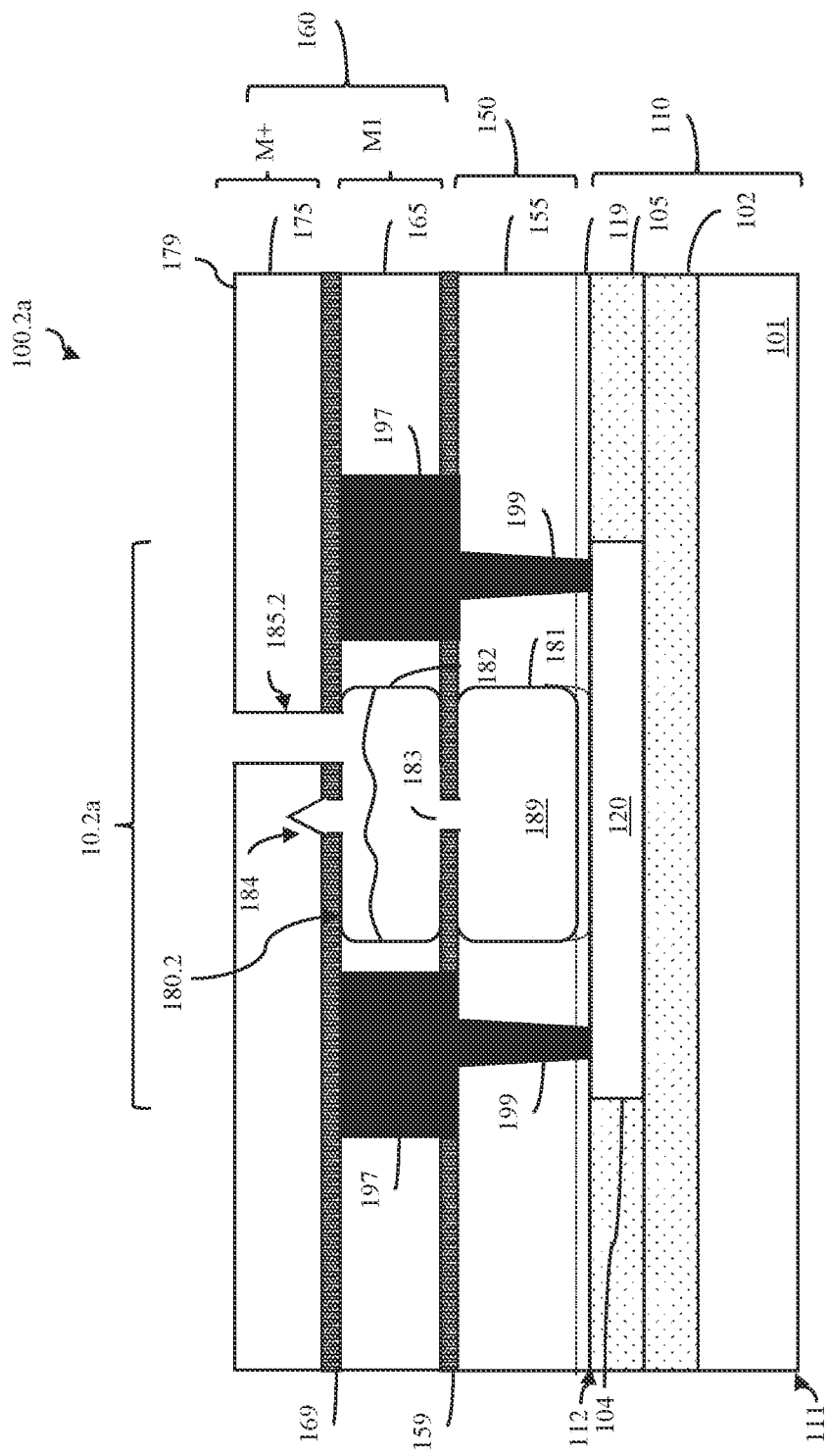
FIG. 1.2a

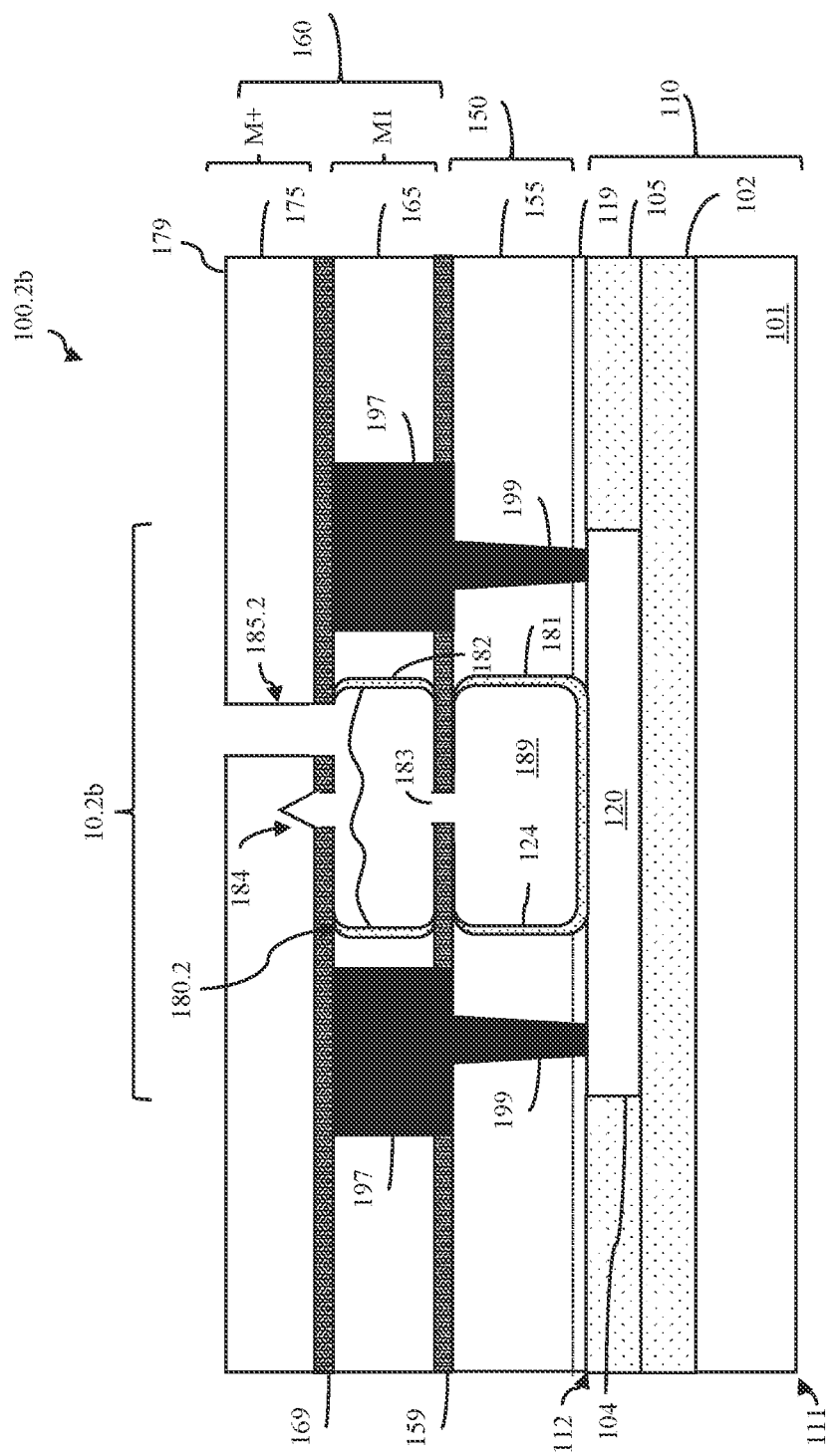
FIG. 1.2b

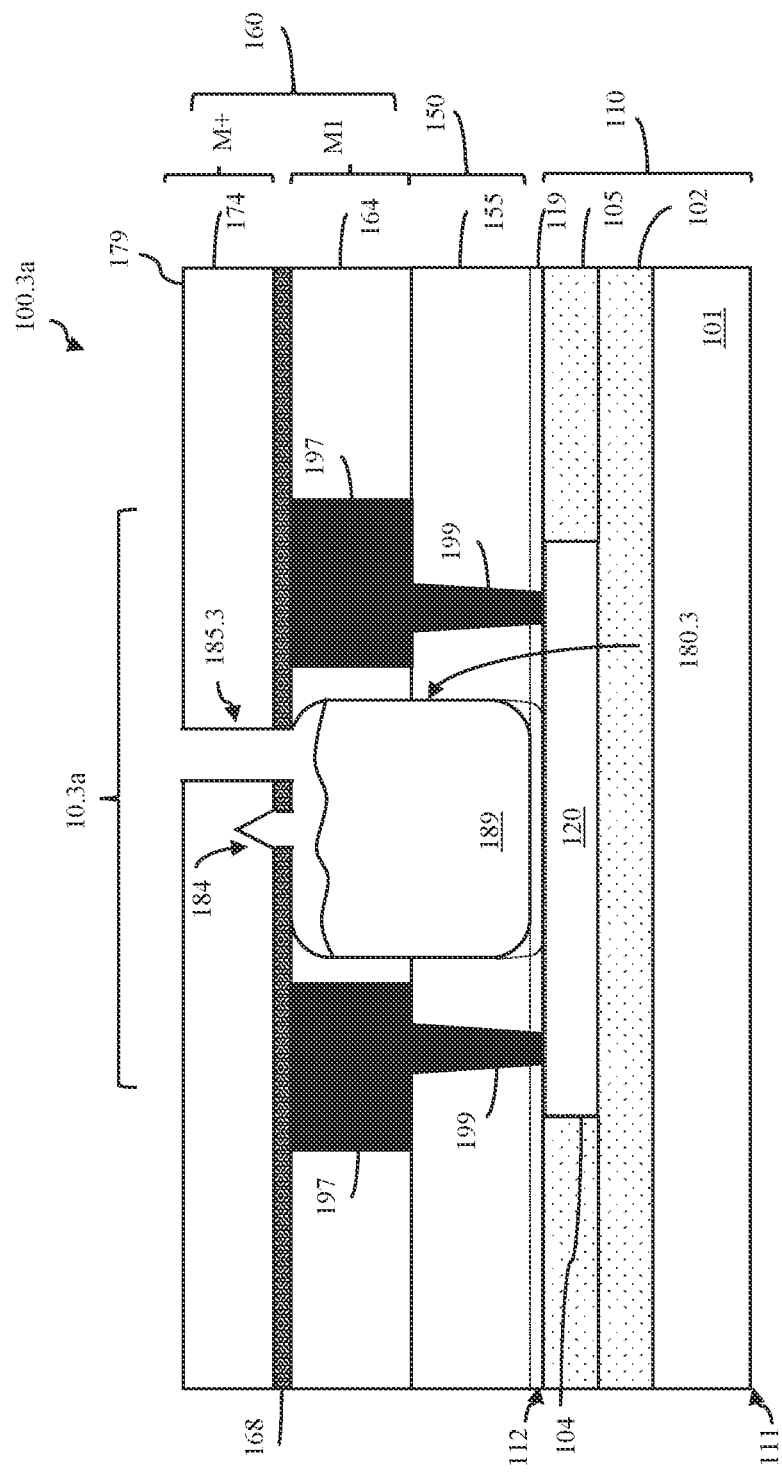
FIG. 1.3a

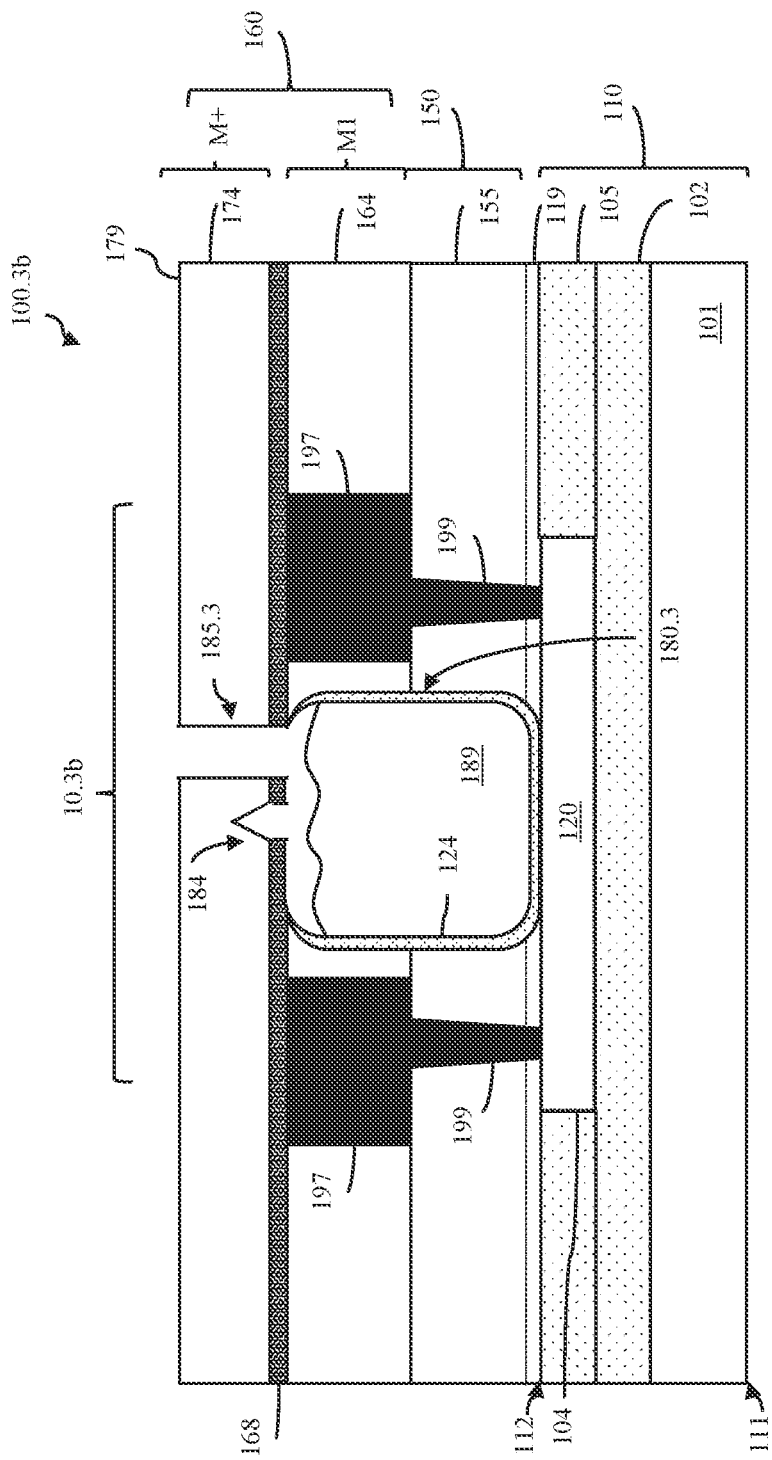
FIG. 1.3b

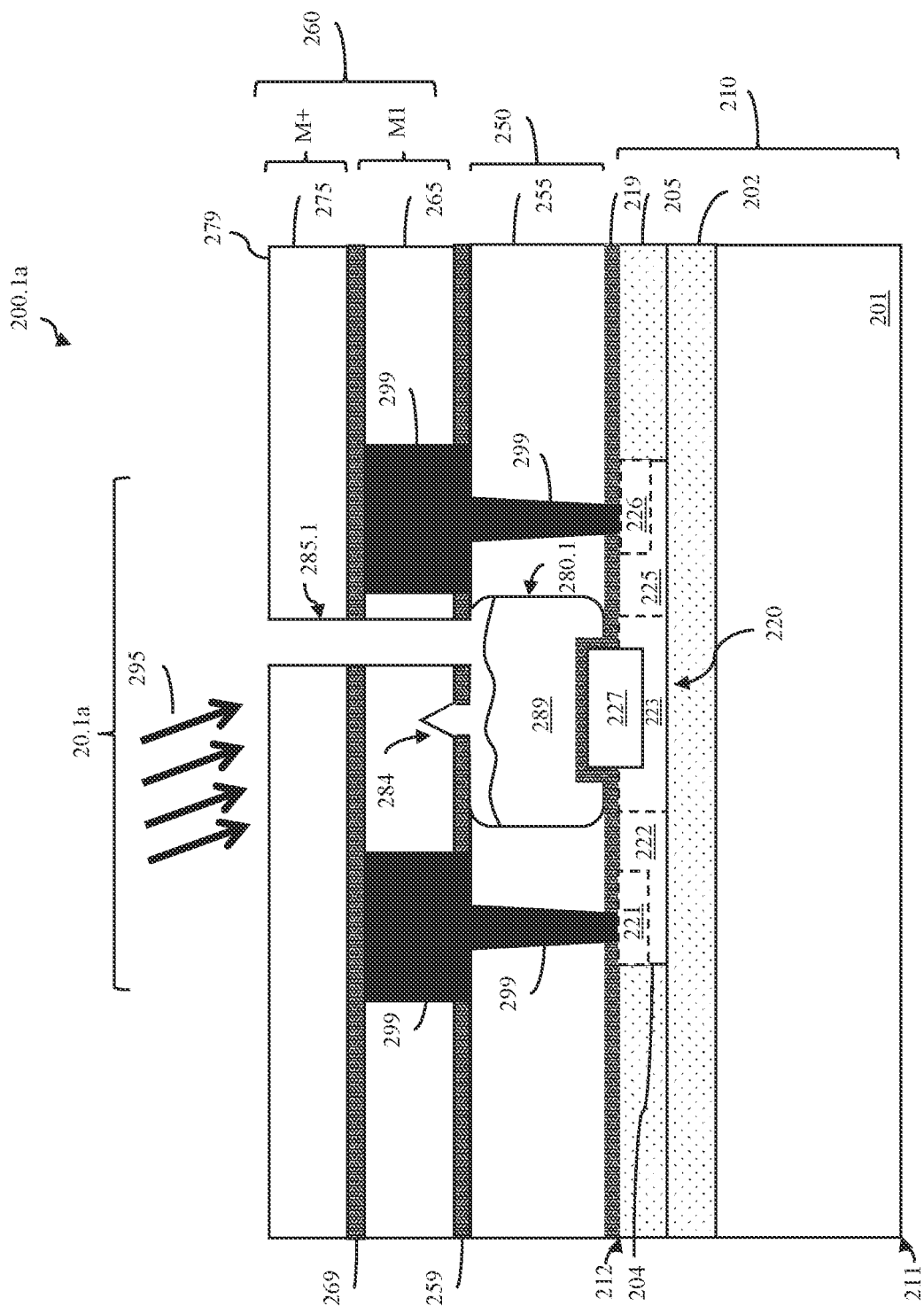
FIG. 2.1a

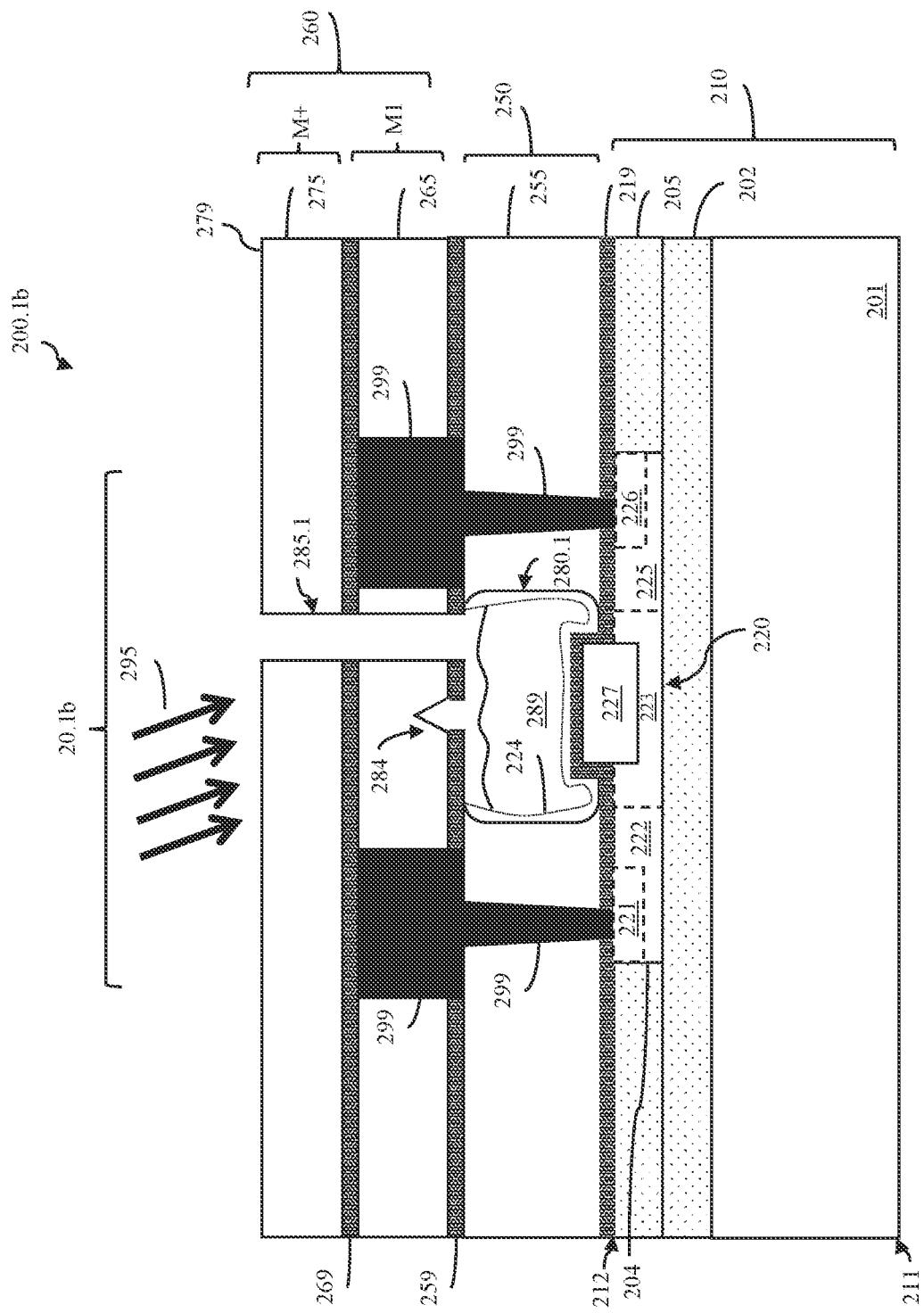
FIG. 2.1b

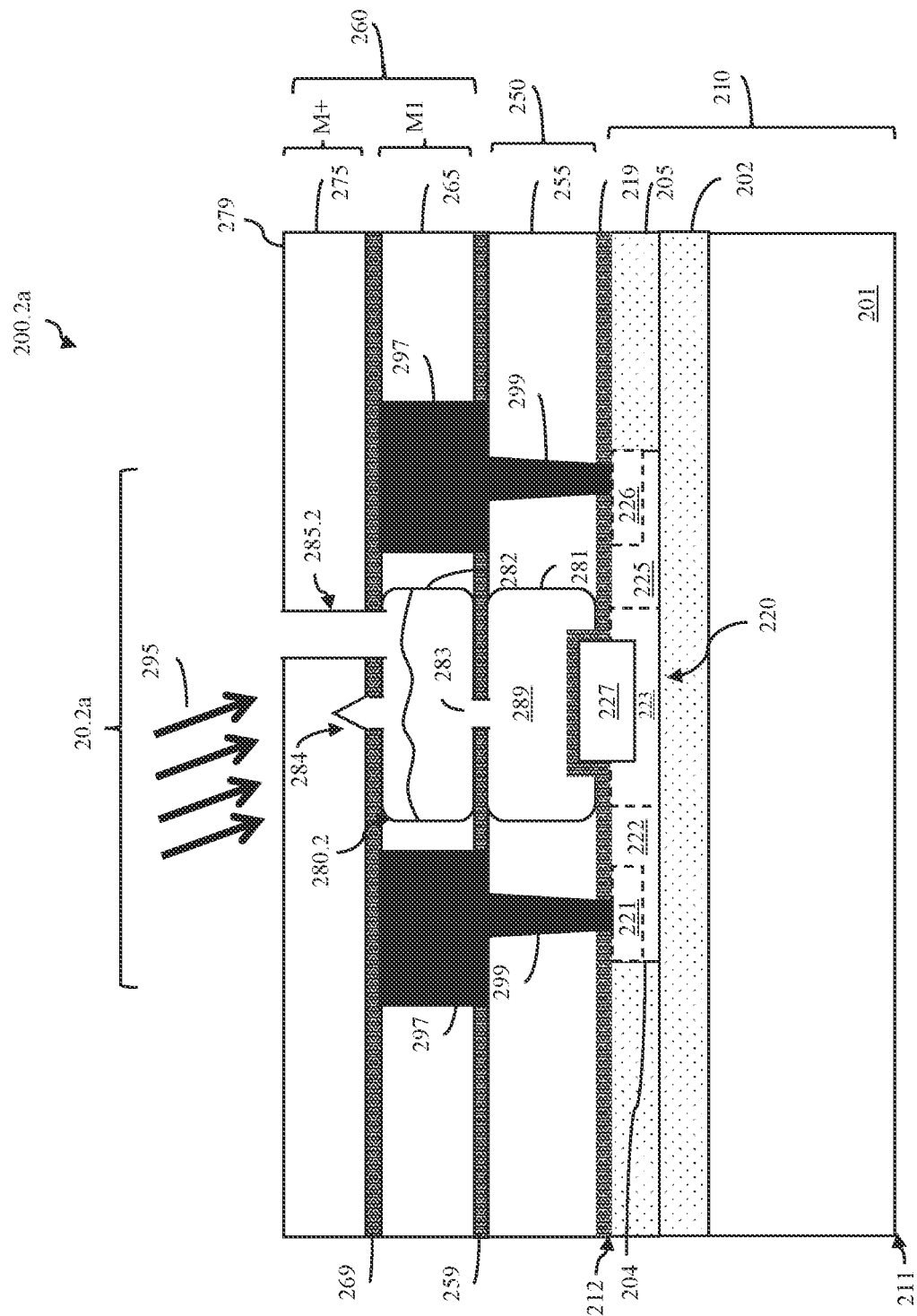
FIG. 2.2a

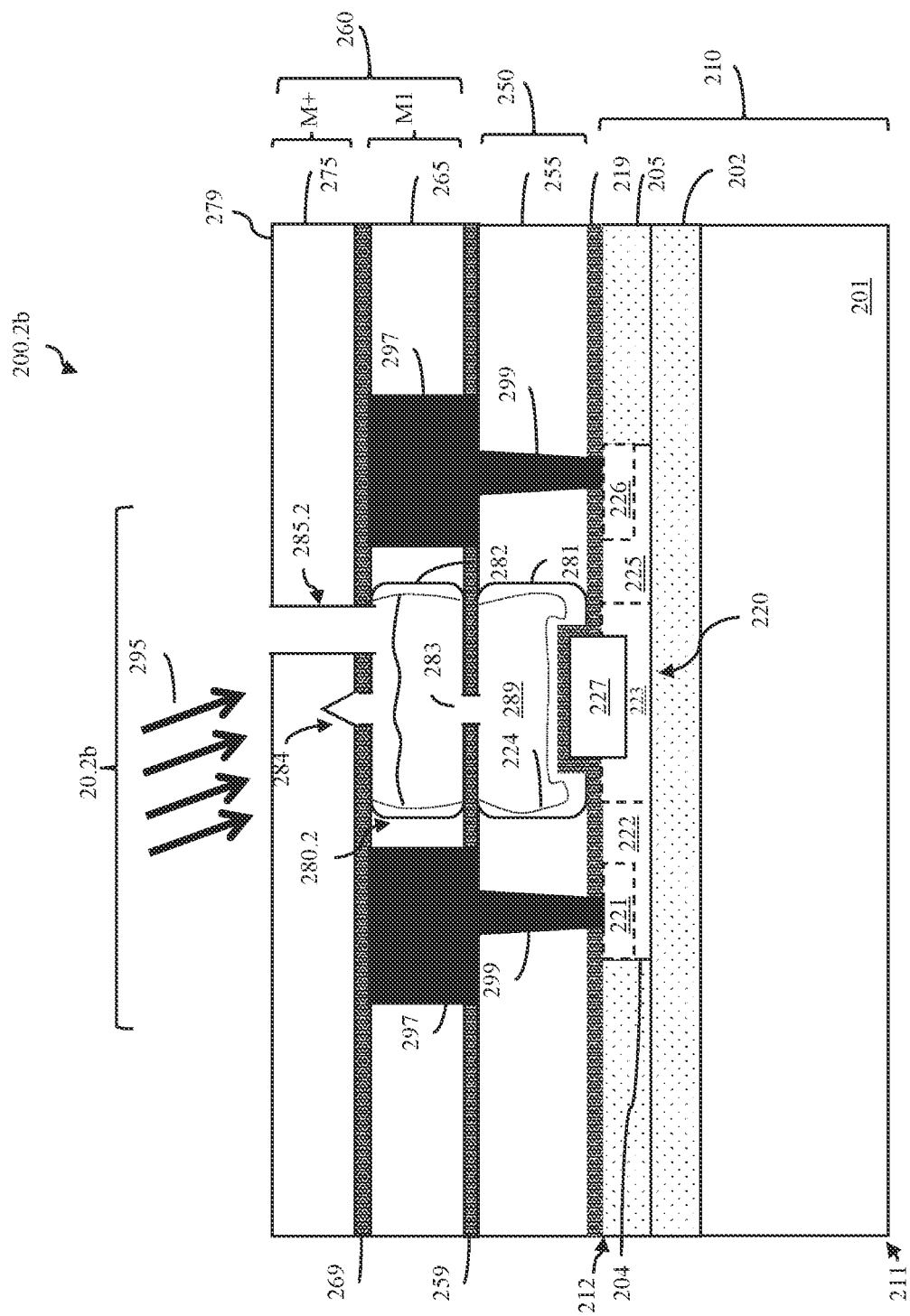
FIG. 2.2b

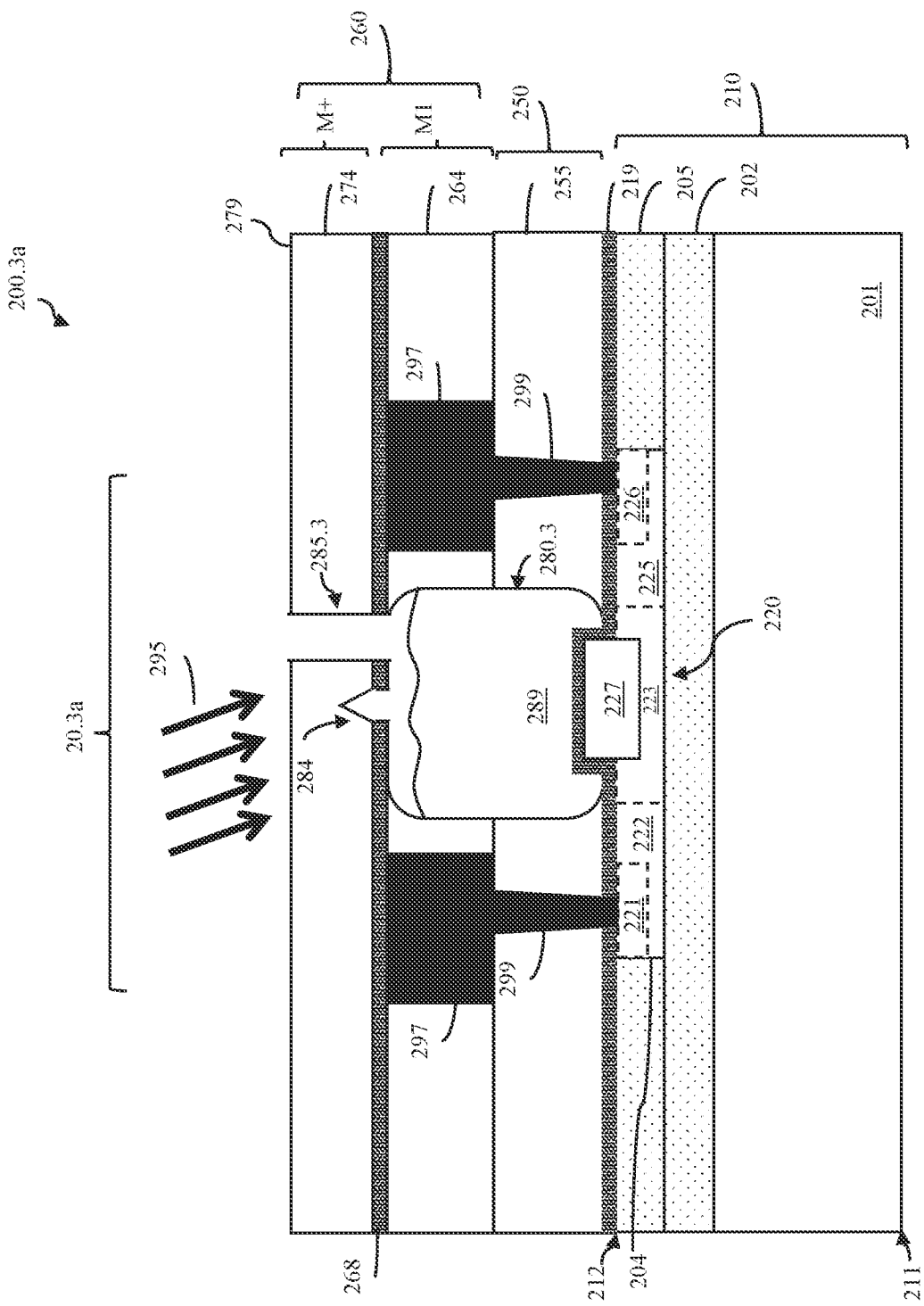
FIG. 2.3a

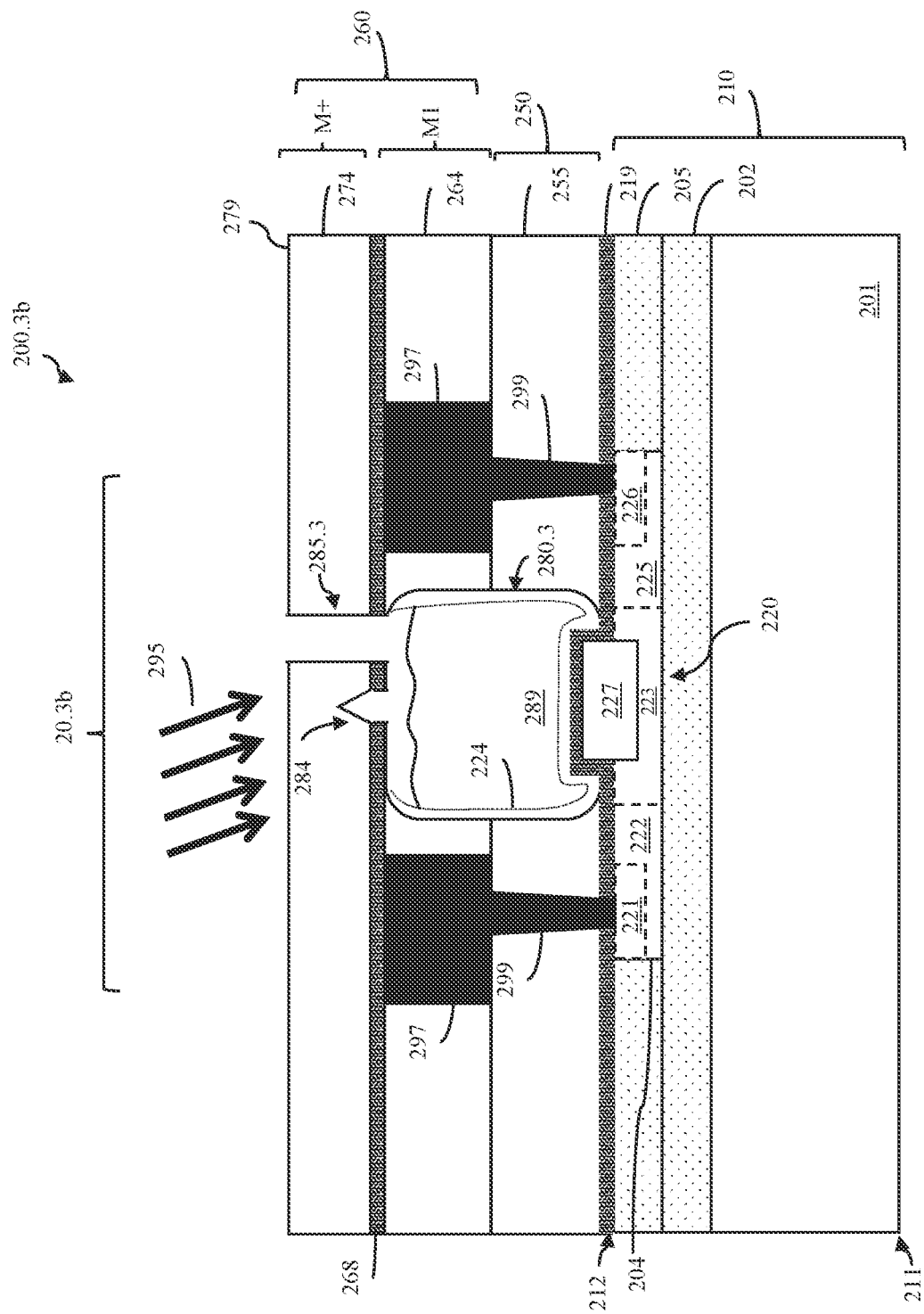
FIG. 2.3b

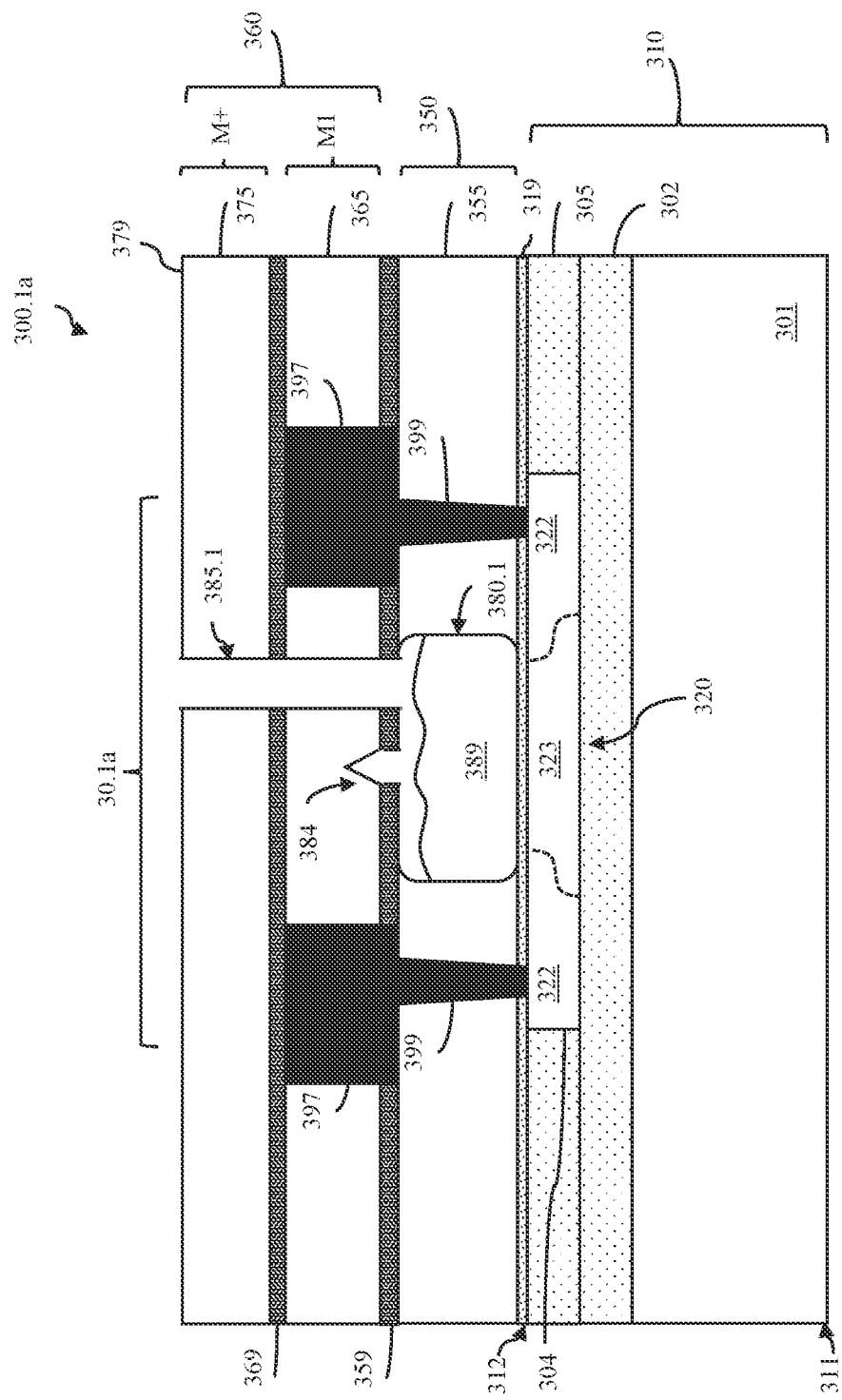
FIG. 3.1a

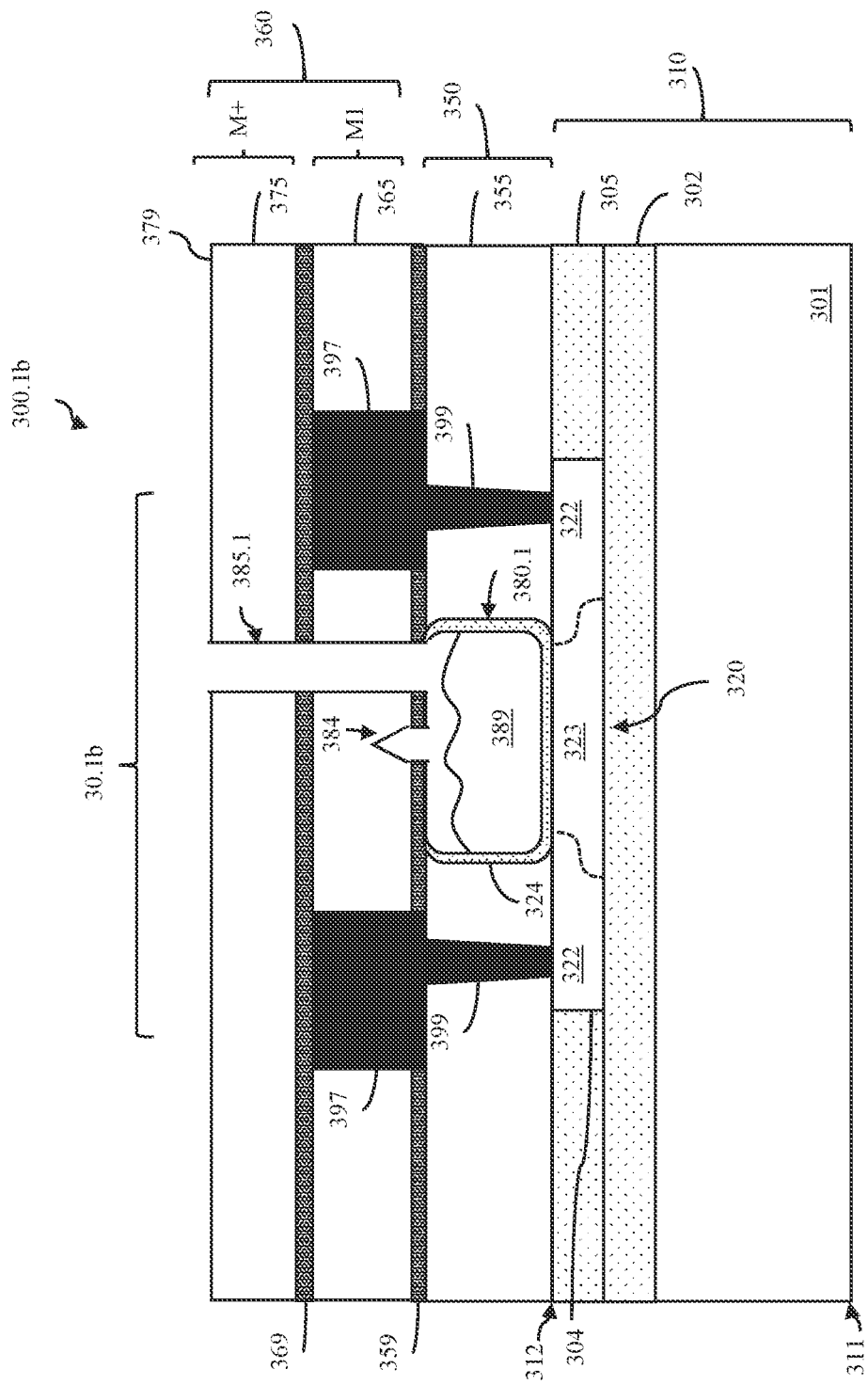
FIG. 3.1b

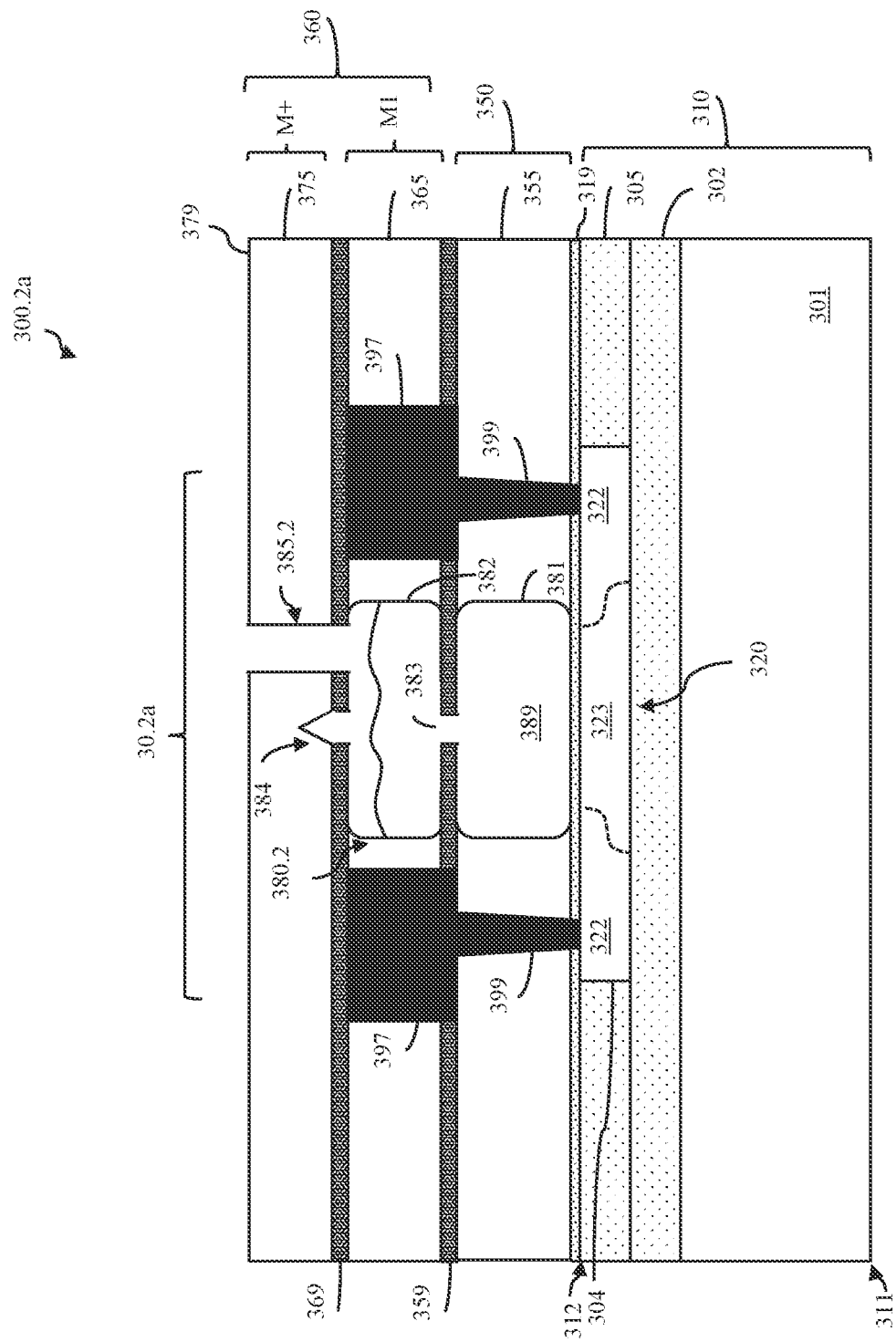
FIG. 3.2a

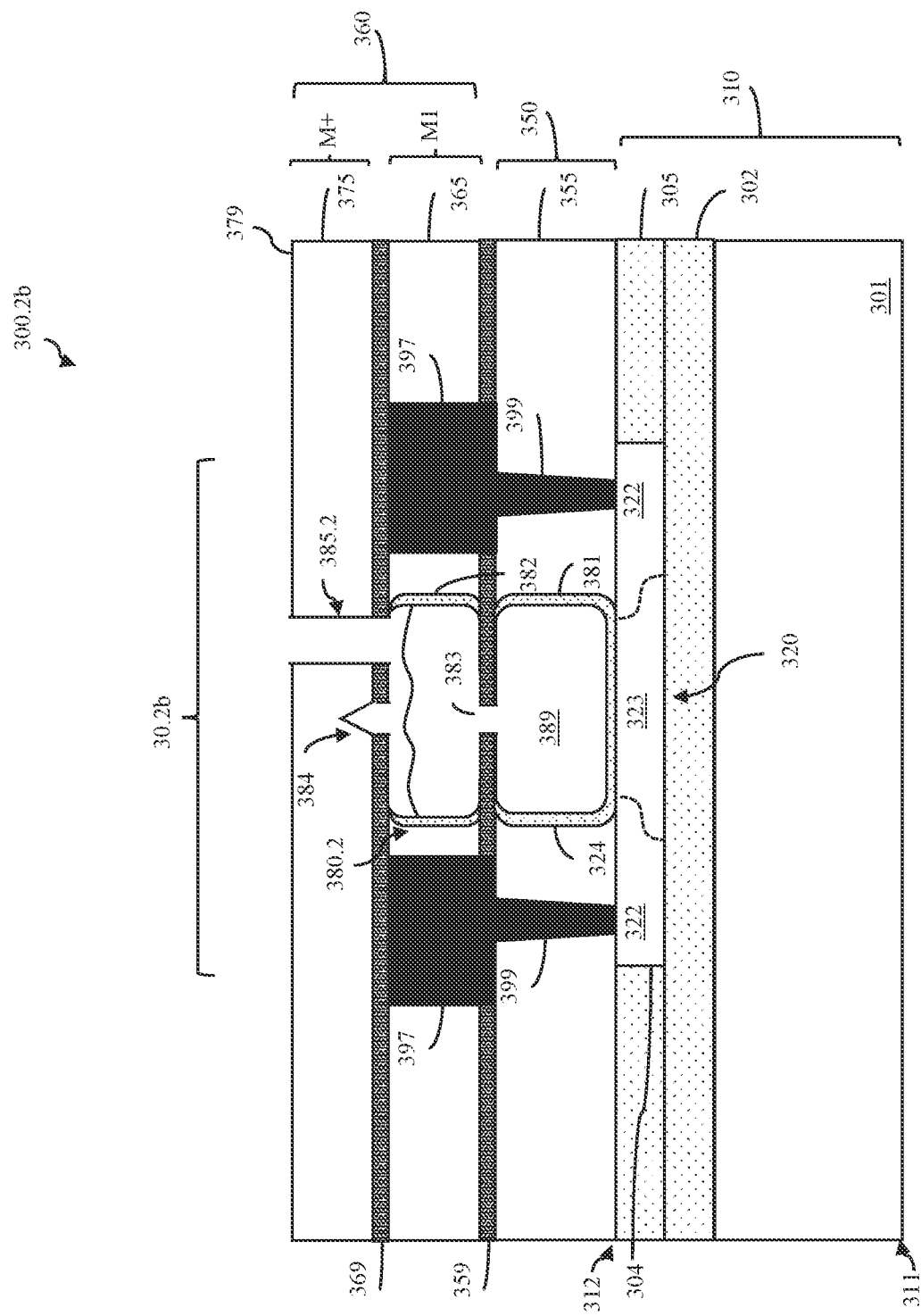
FIG. 3.2b

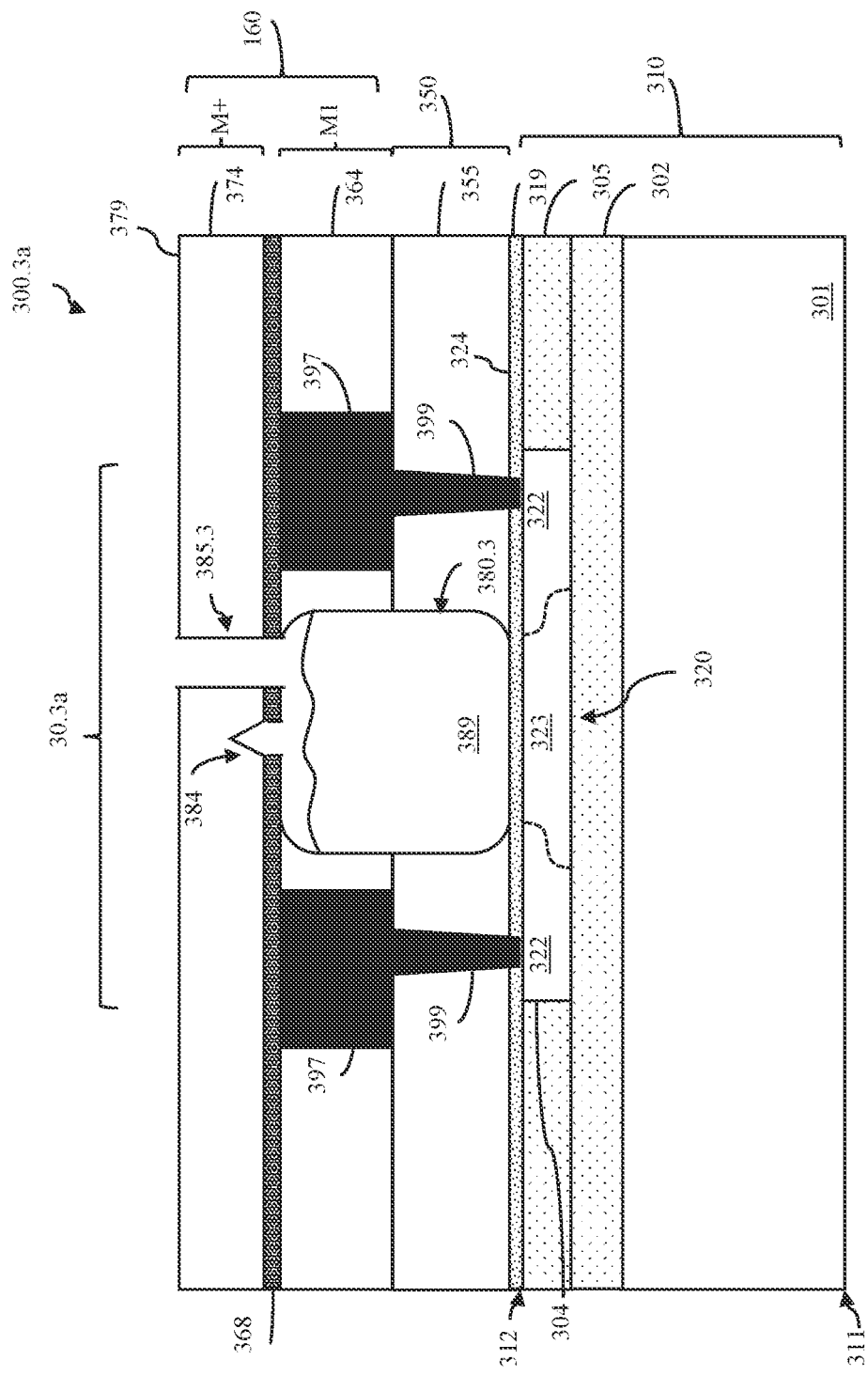
FIG. 3.3a

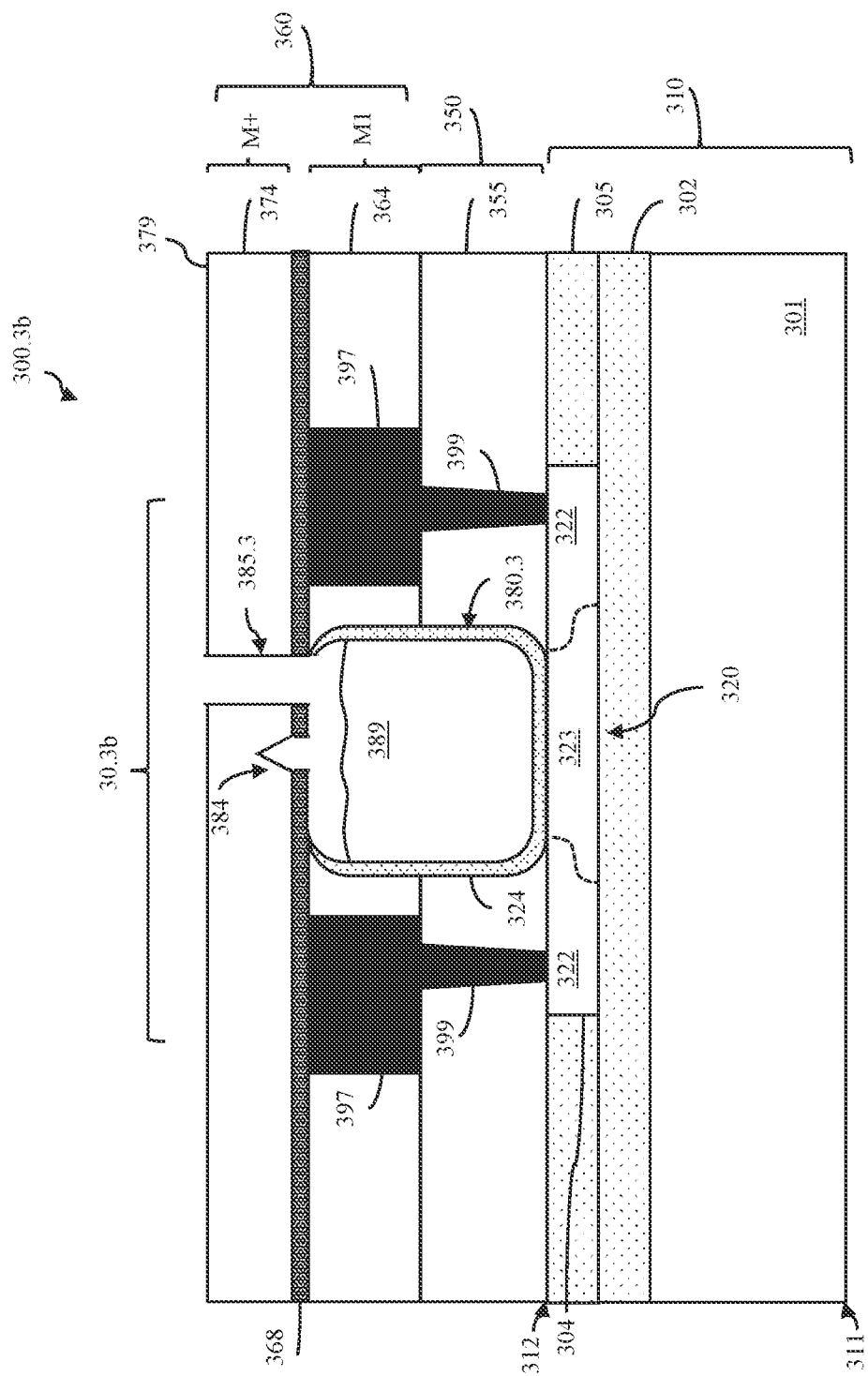
FIG. 3.3b

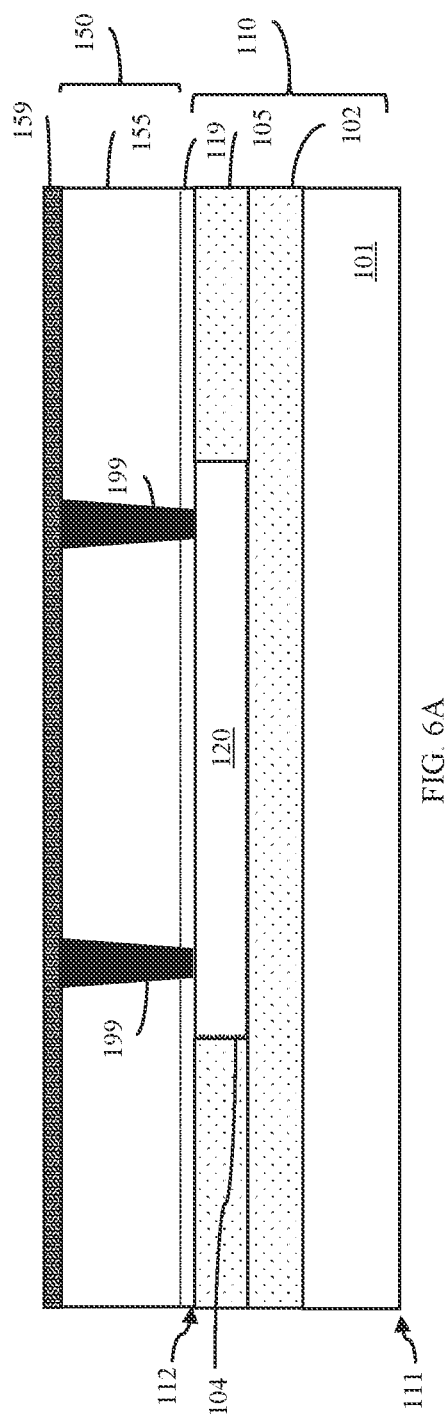
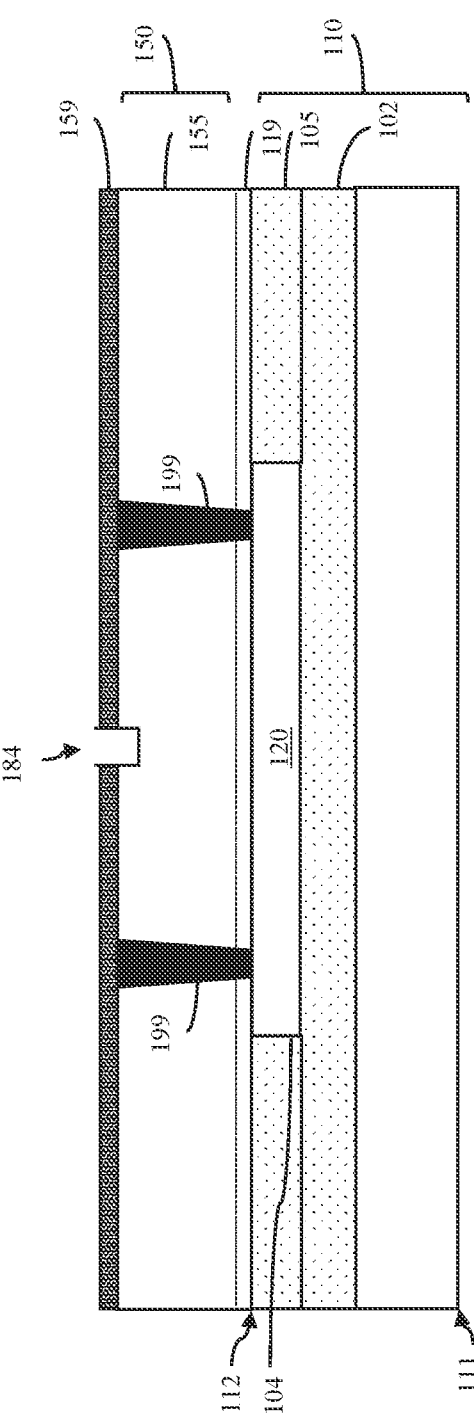
FIG. 6A
FIG. 6B

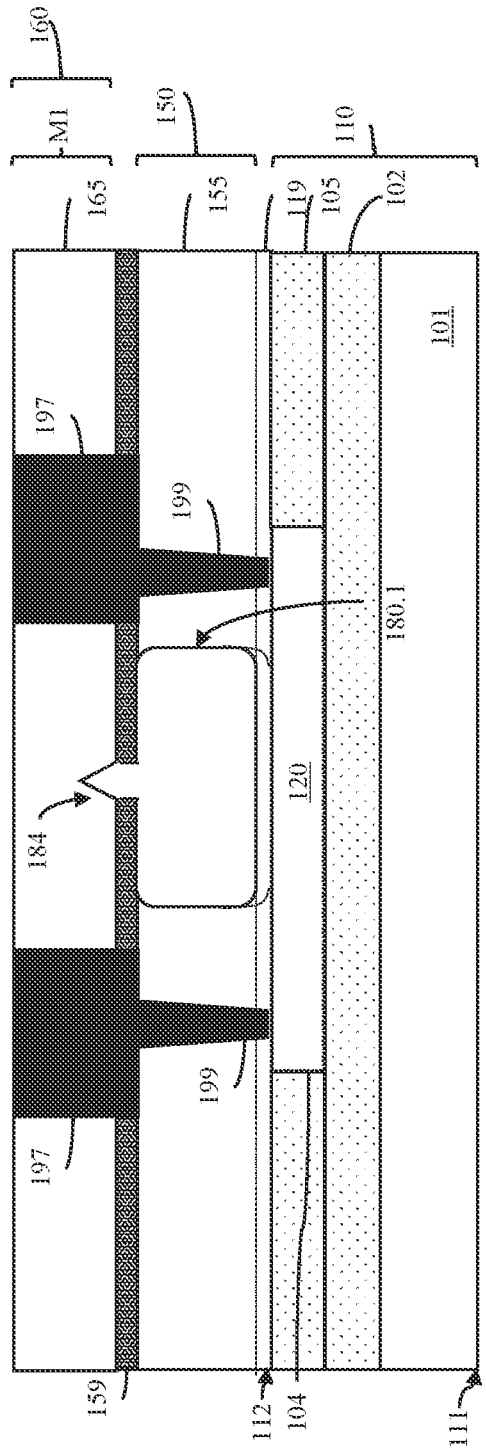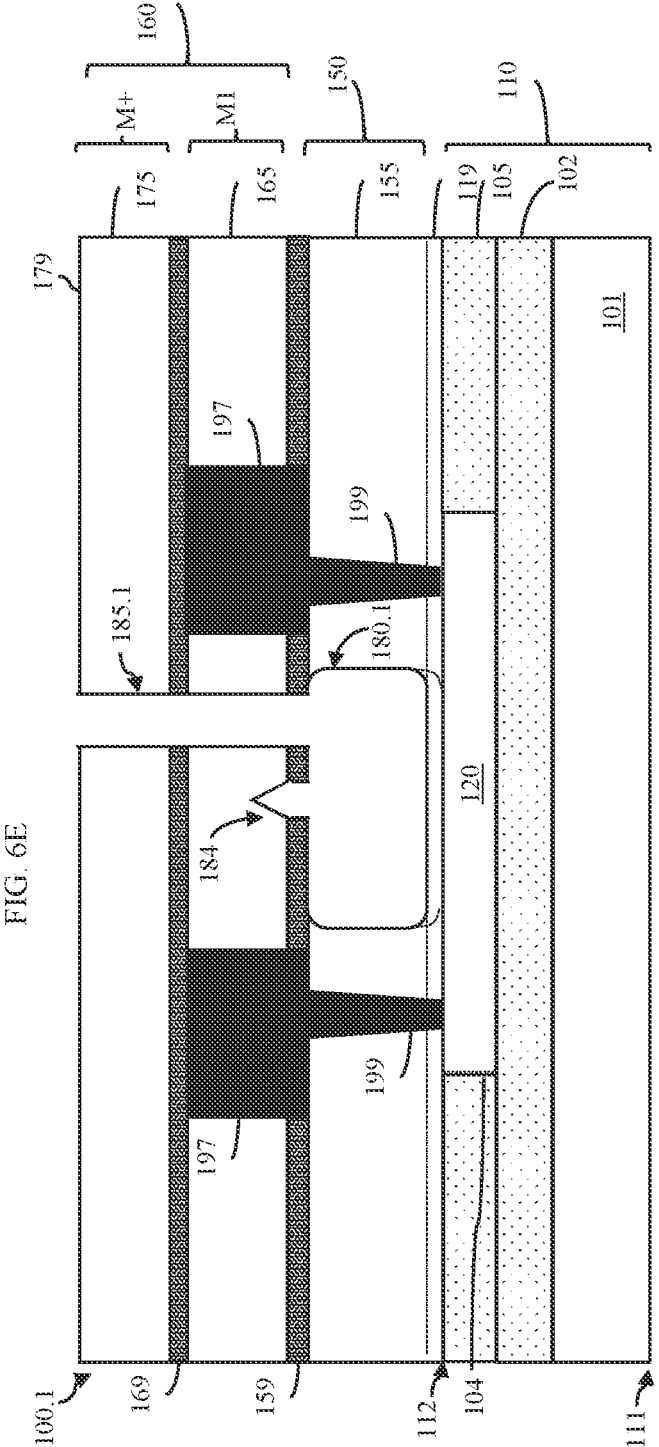
FIG. 6E
FIG. 6F

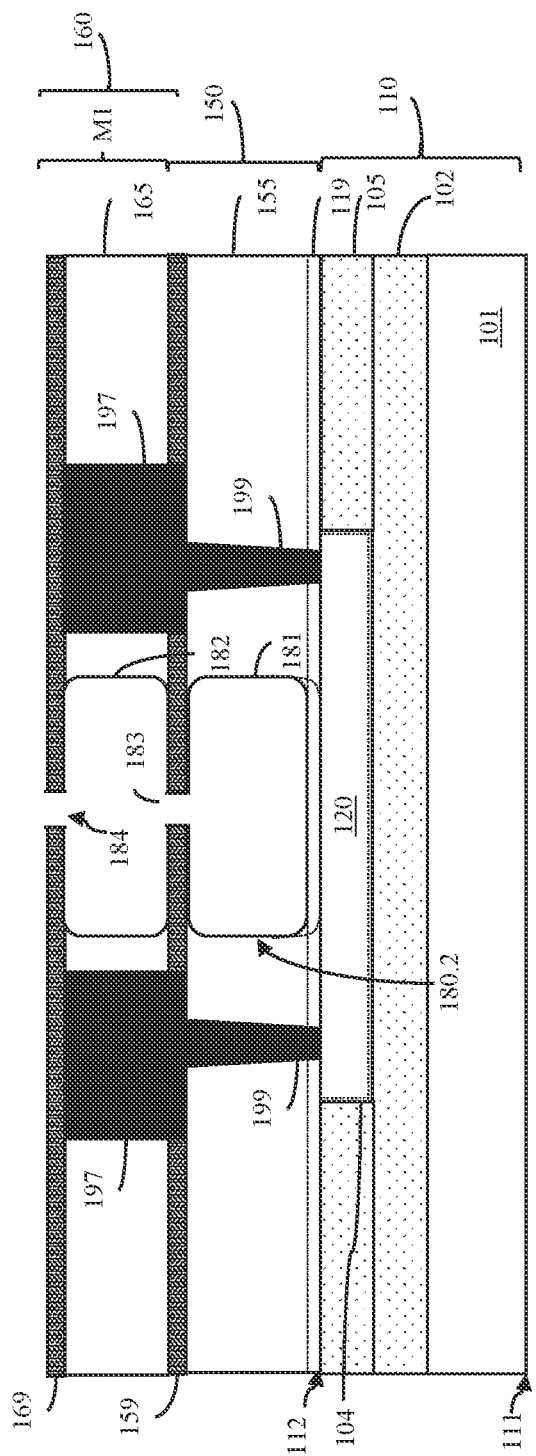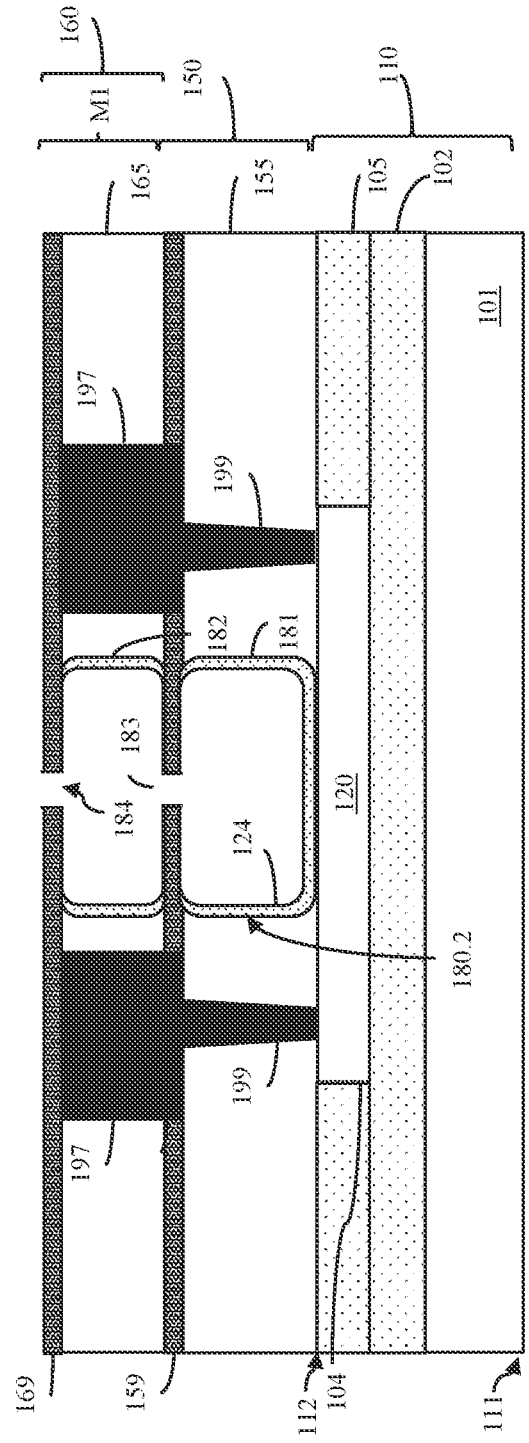
FIG. 7C
FIG. 7D

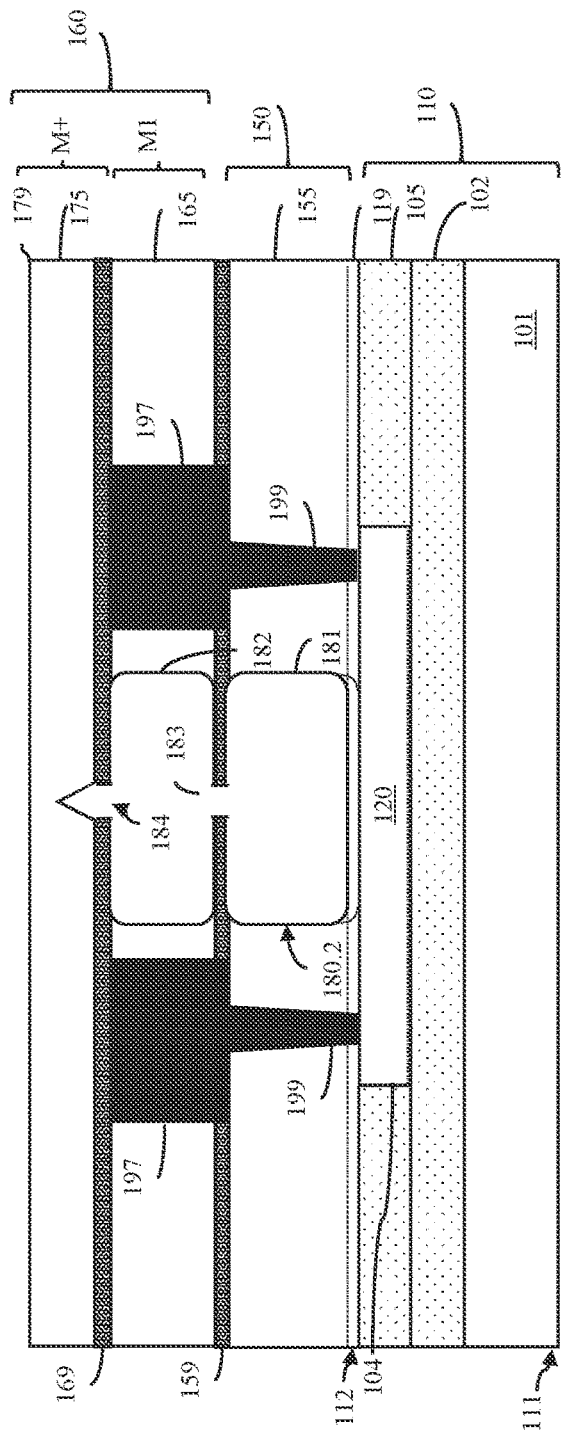
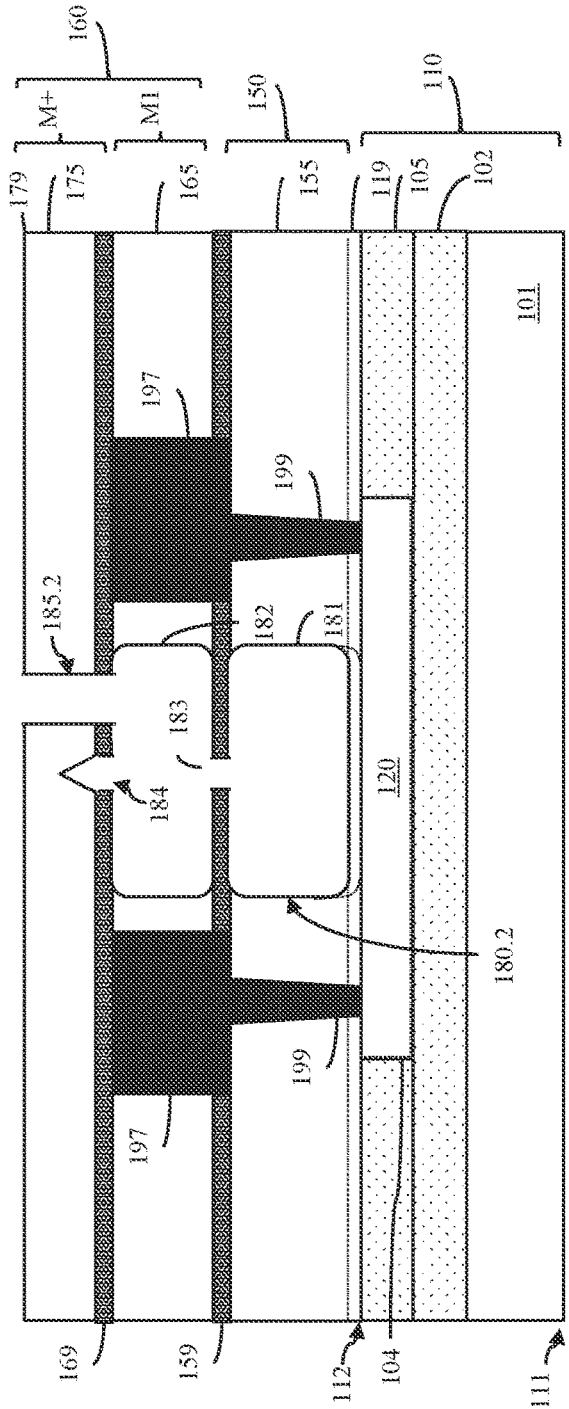
FIG. 7E
FIG. 7F

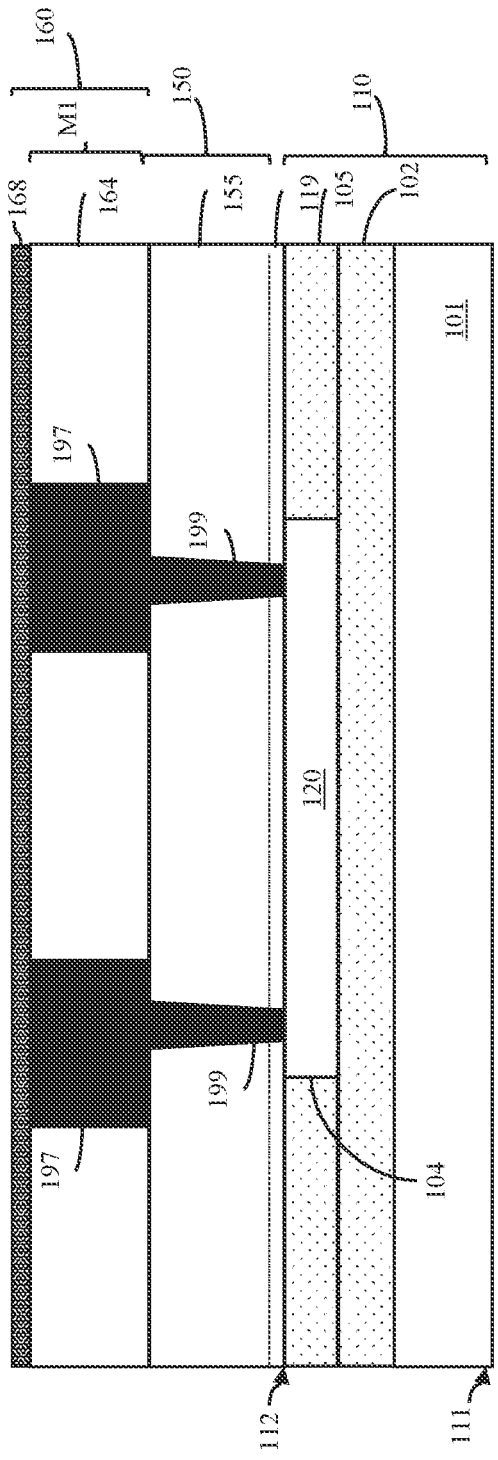
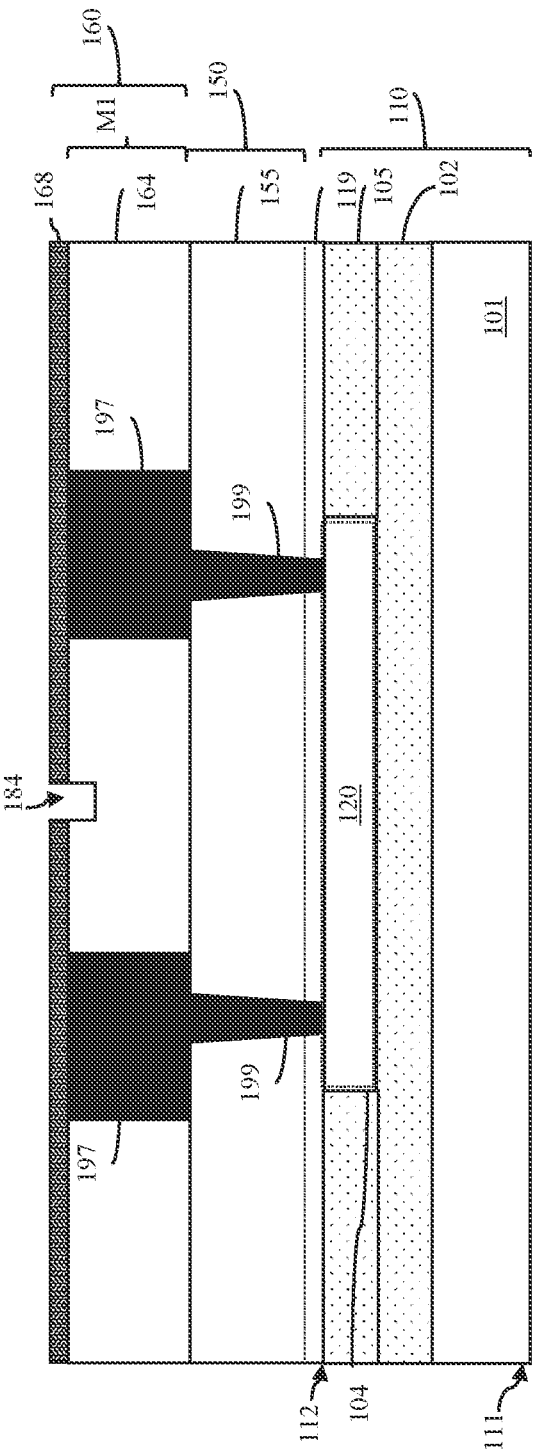
FIG. 8A
FIG. 8B

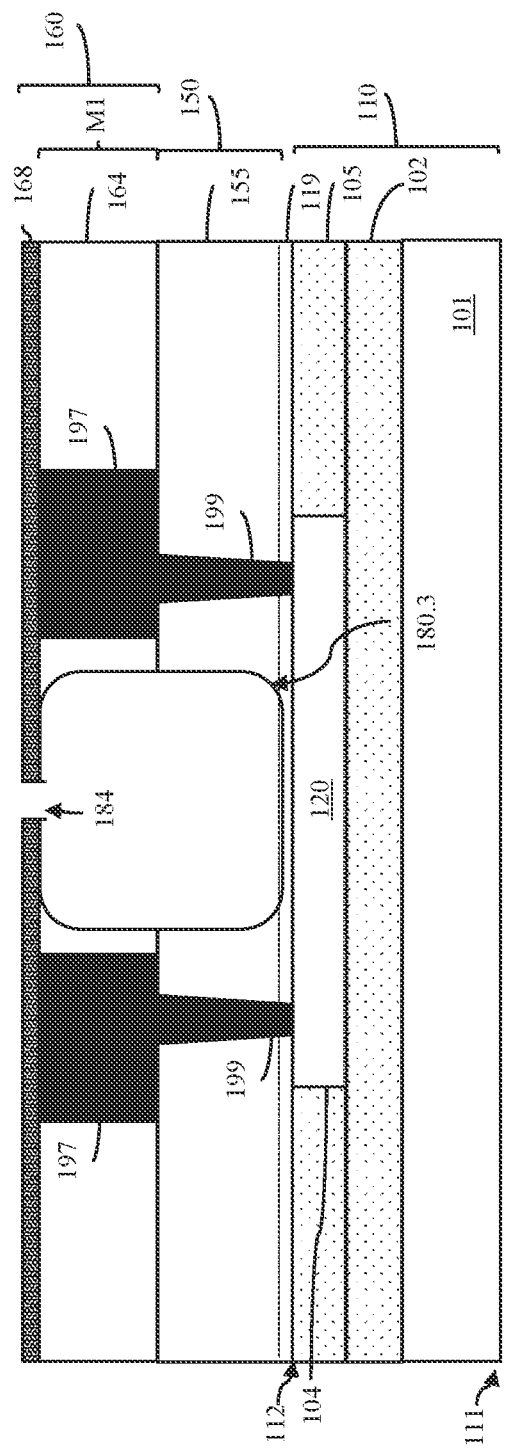
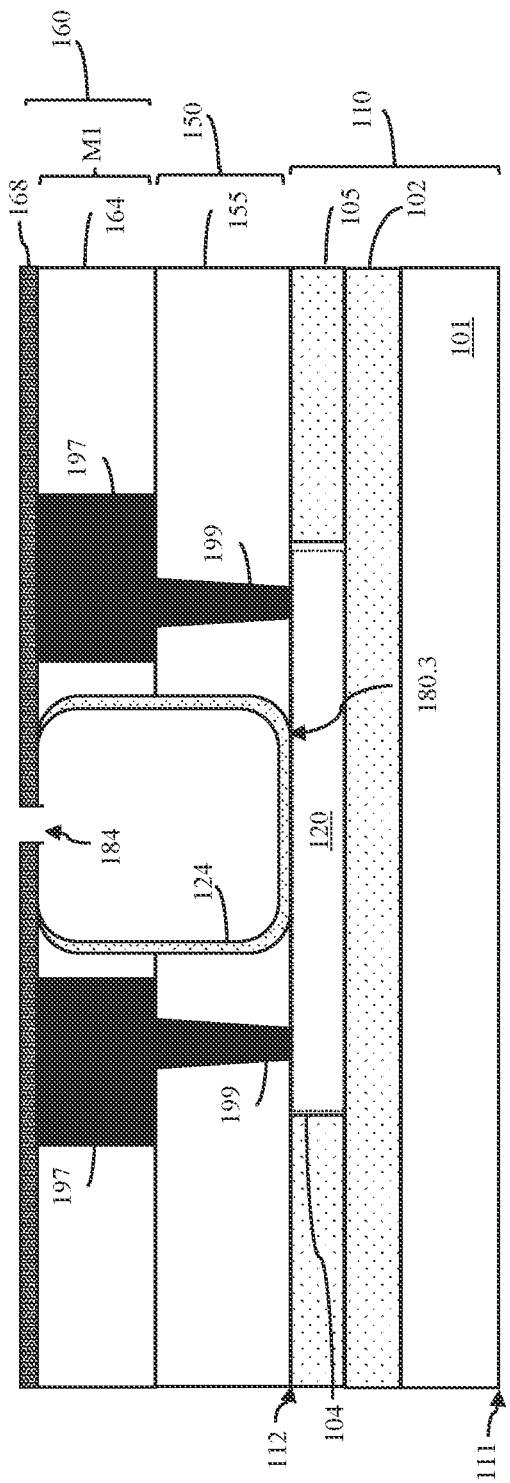
FIG. 8C
FIG. 8D

SEMICONDUCTOR STRUCTURE WITH FRONTSIDE PORT AND CAVITY FEATURES FOR CONVEYING SAMPLE TO SENSING ELEMENT

BACKGROUND

Field of the Invention

The present invention relates to lab-on-chip (LOC) sensors and, more particularly, to embodiments of a semiconductor structure including a LOC sensor and to method embodiments for forming the semiconductor structure.

Description of Related Art

LOC sensors typically include a sensing element, which is on the frontside of a substrate and covered by middle of the line (MOL) and back end of the line (BEOL) dielectric layers, and a reservoir, which is on the backside of the substrate and used to expose the sensing element to a fluid sample during a sensing process. Such a LOC sensor can be employed, for example, to detect a target (e.g., an analyte, component, or chemical species, acidity/alkalinity, etc.) in the sample and, optionally, to characterize the target (e.g., measure the concentration of the target, indicate pH level, etc.). However, techniques for forming backside fluid reservoirs are often expensive and are not readily incorporated into the current state-of-the-art complementary metal oxide semiconductor (CMOS) process flow.

SUMMARY

Disclosed herein are embodiments of a semiconductor structure that includes a first dielectric layer on a sensing element and a second dielectric layer on the first dielectric layer. A cavity can be within the first dielectric layer between the sensing element and the second dielectric layer. The semiconductor structure can further include a third dielectric layer on the second dielectric layer and a fourth dielectric layer on the third dielectric layer. One or more first interconnects can be on the sensing element and one or more second interconnects can be on the first interconnect(s). Each first interconnect can extend from the sensing element through the first dielectric layer to a corresponding second interconnect. Each second interconnect can extend from the first interconnect through the second dielectric layer and the third dielectric layer to the fourth dielectric layer. A port can extend from the cavity at least through the second dielectric layer, the third dielectric layer and the fourth dielectric layer.

Other embodiments of the semiconductor structure disclosed herein can include a first dielectric layer on a sensing element, a second dielectric layer on the first dielectric layer, a third dielectric layer on the second dielectric layer, and a fourth dielectric layer on the third dielectric layer. A cavity can have a first section within the first dielectric layer between the sensing element and the second dielectric layer. The cavity can further have a second section in the third dielectric layer between the second dielectric layer and the fourth dielectric layer. A connecting duct can extend vertically through the third dielectric layer between the first and second sections of the cavity. The semiconductor structure can further include a fifth dielectric layer on the fourth dielectric layer. The semiconductor structure can further include one or more first interconnects on the sensing element and one or more second interconnects on the first interconnect(s). Each first interconnect can extend from the sensing element through the first dielectric layer to a corresponding second interconnect. Each second interconnect can extend from the first interconnect through the second dielectric layer and the third dielectric layer to the fourth dielectric layer. A port can extend from the cavity at least through the fourth dielectric layer and the fifth dielectric layer.

Still other embodiments of a semiconductor structure disclosed herein can include a first dielectric layer on a sensing element, a second dielectric layer on the first dielectric layer, and a third dielectric layer on the second dielectric layer. A cavity can be within the first dielectric layer and the second dielectric layer between the sensing element and the third dielectric layer. The semiconductor structure can further include a fourth dielectric layer on the third dielectric layer. The semiconductor structure can further include one or more first interconnects on the sensing element and one or more second interconnects on the first interconnect(s). Each first interconnect can extend from the sensing element through the first dielectric layer to a corresponding second interconnect. Each second interconnect can extend from the first interconnect through the second dielectric layer to the third dielectric layer. A port can extend from the cavity at least through the third dielectric layer and the fourth dielectric layer.

BRIEF DESCRIPTION OF THE SEVERAL VIEWS OF THE DRAWINGS

The present invention will be better understood from the following detailed description with reference to the drawings, which are not necessarily drawn to scale and in which:

FIGS. 1.1a-1.3b are cross-section diagrams illustrating generally disclosed semiconductor structures, respectively, each having a LOC sensor;

FIGS. 2.1a-2.3b are cross-section diagrams illustrating other disclosed semiconductor structures, respectively, each having a LOC photodetector-type sensing element;

FIGS. 3.1a-3.3b are cross-section diagrams illustrating still other disclosed semiconductor structures, respectively, each having a LOC field effect transistor (FET)-type sensing element;

FIGS. 6A-6F are cross-section diagrams illustrating partially completed semiconductor structures, respectively, formed according to Process Flow 1 set forth in the flow diagram of FIG. 4;

FIGS. 7A-7F are cross-section diagrams illustrating partially completed semiconductor structures, respectively, formed according to Process Flow 2 set forth in the flow diagram of FIG. 4; and FIGS. 8A-8F are cross-section diagrams illustrating partially completed semiconductor structures, respectively, formed according to Process Flow 1 set forth in the flow diagram of FIG. 4.

DETAILED DESCRIPTION

Figure 4:
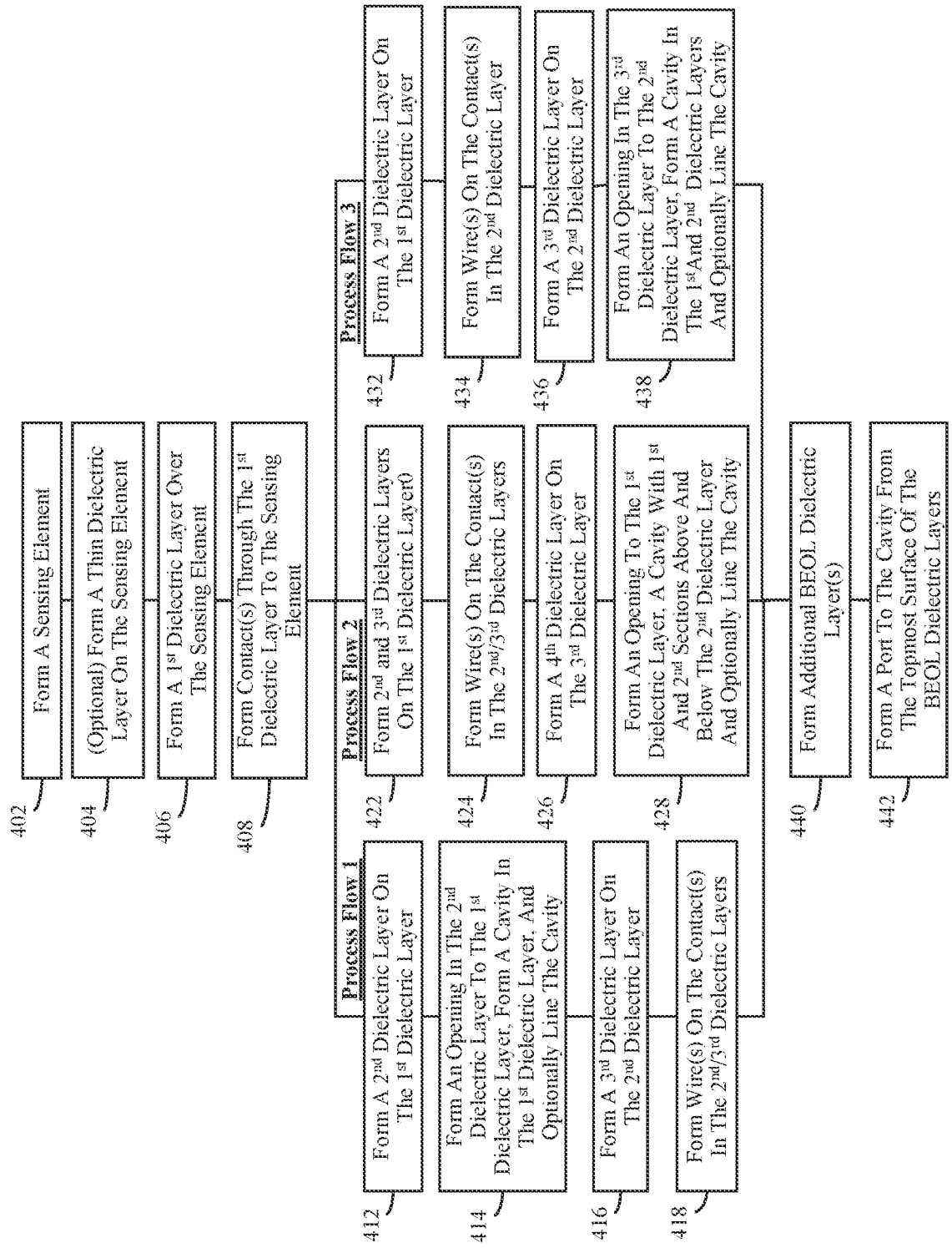
FIG. 4 is a flow diagram illustrating method embodiments for forming the semiconductor structures of FIGS. 1.1a-1.3b.

As mentioned above, LOC sensors typically include a sensing element, which is on the frontside of a substrate and covered by MOL and BEOL dielectric layers, and a reservoir, which is on the backside of the substrate and used to expose the sensing element to a fluid sample during a sensing process. Such a LOC sensor can be employed, for example, to detect a target (e.g., an analyte, component, or chemical species, acidity/alkalinity, etc.) in the sample and, optionally, to characterize the target (e.g., measure the concentration of the target, indicate pH level, etc.). However, techniques for forming backside fluid reservoirs are often expensive and are not readily incorporated into the current state-of-the-art CMOS process flow.

In view of the foregoing, disclosed herein are embodiments of a semiconductor structure including a LOC sensor with a sensing element and with frontside port and cavity features for conveying a sample (e.g., of a fluid or gas) toward the sensing element. Specifically, the disclosed embodiments can include a cavity adjacent to a portion of a sensing element. In some embodiments, this cavity can be confined within MOL dielectric layer(s) (e.g., positioned laterally adjacent to contact(s) on the sensing element). In other embodiments, the cavity can include a lower section within MOL dielectric layer(s) (e.g., positioned laterally adjacent to contact(s) on the sensing element), an upper section within BEOL dielectric layer(s) at the first metal (M1) level (e.g., positioned laterally adjacent to wire(s) on the contact(s)), and an etchstop divider between the first section and the second section and having a connecting duct that extends vertically therethrough to link the two sections. In still other embodiments, the cavity can include a lower portion within MOL dielectric layer(s) (e.g., positioned laterally adjacent to contact(s) on the sensing element) and an upper portion continuous with the lower portion and within BEOL dielectric layer(s) at the M1 level (e.g., positioned laterally adjacent to wire(s) on the contact(s)). Optionally, in each of the embodiments, the cavity can be separated from the sensing element by an additional dielectric layer and/or at least the bottom of the cavity can be lined with a dielectric liner. The disclosed embodiments can also include a frontside inlet/outlet port extending from a topmost surface (i.e., external surface) of the BEOL dielectric layer(s) down to the cavity, thereby allowing a sample (e.g., a fluid or a gas) to flow from outside the semiconductor structure toward the sensing element for sensing.

FIGS. 1.1a-1.3b are cross-section diagrams illustrating disclosed embodiments of a semiconductor structure 100.1a-100.3b, respectively, where each semiconductor structure 100.1a-100.3b includes a LOC sensor 10.1a-10.3b with a sensing element 120 and with frontside port 185.1-185.3 and cavity 180.1-180.3 features for conveying a sample 189 (also referred to herein as a test sample) toward the sensing element 120. The sample 189 can specifically be a flowable sample such as, for example, a fluid (as shown) or a gas. The sensing element 120 can be any on-chip type sensing element suitable for use in testing the sample 189 such as suitable for use in detecting a target (e.g., an analyte, component, or chemical species, acidity or alkalinity, etc.) in the sample 189 and, optionally, suitable for use in characterizing the target (e.g., measuring the concentration of the target, indicating pH level, etc.). Such sensing elements 120 for LOC sensors can include, but are not limited to, photodetector-type sensing elements, field effect transistor (FET)-type sensing elements, such as biosensor FET-type sensing elements or ion-sensitive FET-type sensing elements, or any other type of sensing element suitable for use in testing the sample 189.

FIGS. 2.1a-2.3b are cross-section diagrams specifically illustrating embodiments of a semiconductor structure 200.1a-200.3b, respectively, where each semiconductor structure 200.1a-200.3b includes a LOC sensor 20.1a-20.3b with a photodetector-type sensing element 220 and with frontside port 285.1-285.3 and cavity 280.1-280.3 features for conveying a sample 289 (also referred to herein as a test sample) toward an absorption region 227 of the photodetector-type sensing element 220. The sample 289 can specifically be a flowable sample such as, for example, a fluid (as shown) or a gas.

FIGS. 3.1a-3.3b are cross-section diagrams specifically illustrating embodiments of a semiconductor structure 300.1a-300.3b, respectively, where each semiconductor structure 300.1a-300.3b includes a LOC sensor 30.1a-30.3b, respectively, with a FET-type sensing element 320 and with frontside port 385.1-385.3 and cavity 380.1-380.3 features for conveying a sample 389 (also referred to herein as a test sample) toward a channel region 323 of an active semiconductor device region of the FET-type sensing element 320. The sample 389 can specifically be a flowable sample such as, for example, a fluid (as shown) or a gas.

More particularly, referring to FIGS. 1.1a-1.3b, 2.1a-2.3b and 3.1a-3.3b, disclosed herein are embodiments of a semiconductor structure 100.1a-100.3b, 200.1a-200.3b, and 300.1a-300.3b, respectively. The semiconductor structure 100.1a-100.3b, 200.1a-200.3b, 300.1a-300.3b could be a semiconductor-on-insulator (e.g., silicon-on-insulator (SOI) structure). That is, as illustrated, the semiconductor structure can include a semiconductor substrate 101, 201, 301 (e.g., a silicon (Si) substrate), an insulator layer 102, 202, 302 (e.g., a buried oxide (BOX) layer, such as a buried silicon dioxide ($SiO_2$) layer, or some other suitable insulator layer), on the semiconductor substrate 101, 201, 301, and a monocrystalline semiconductor layer 104, 204, 304 (e.g., a Si layer or some other suitable monocrystalline semiconductor layer) on the insulator layer 102, 202, 302. Alternatively, the semiconductor structure could be a bulk semiconductor structure including a bulk monocrystalline semiconductor substrate (e.g., a bulk Si substrate). In any case, the semiconductor structure can have a backside 111, 211, 311 (i.e., at the bottom surface of the semiconductor substrate) and a frontside 112, 212, 312 opposite the backside 111, 211, 311. In the case of a semiconductor-on-insulator structure the frontside 112, 212, 312 refers to the side with the semiconductor layer 104, 204, 304, whereas in the case of a bulk semiconductor structure the frontside 112, 212, 312 refers to the side at the top surface of the semiconductor substrate.

The semiconductor structure 100.1a-100.3b, 200.1a-200.3b, 300.1a-300.3b can include a LOC sensor 10.1a-10.3b, 20.1a-20.3b, 30.1a-30.3b on the frontside 112, 212, 312. The LOC sensor 10.1a-10.3b, 20.1a-20.3b, 30.1a-30.3b can include a sensing element 120, 220, 320 formed during front end of the line (FEOL) 110, 210, 310 processing on the frontside 112, 212, 312 of the structure. That is, the sensing element 120, 220, 320 can be a FEOL semiconductor device. Specifically, the sensing element 120, 220, 320 can be formed, in whole or in part, within a semiconductor region on the frontside 112, 212, 312 of the structure. The semiconductor region can be a region of the semiconductor layer 104, 204, 304 in the case of a semiconductor-on-insulator structure (or a region of the upper portion of a semiconductor substrate in the case of a bulk semiconductor structure). The lateral boundaries of this semiconductor region can be defined, for example, by trench isolation regions 105, 205, 305 (e.g., shallow trench isolation (STI) regions). As mentioned above, such a sensing element can include, for example, a photodetector-type sensing elements, field effect transistor (FET)-type sensing elements, such as biosensor FET-type sensing elements or ion-sensitive FET-type sensing elements, or any other type of sensing element suitable for use in testing a sample (also referred to herein as a test sample), as discussed in greater detail below.

The sensing element 120, 220, 320 can be covered, in whole or in part, by one or more MOL dielectric layers 150, 250, 350. The MOL dielectric layer(s) 150, 250, 350 can include, for example, a first dielectric layer 155, 255, 355 including one or more layers of interlayer dielectric (ILD) material. The ILD material can be, for example, silicon dioxide ($SiO_2$), doped silicon glass (e.g., phosphosilicate glass (PSG) or borophosphosilicate glass (BPSG)), or any other suitable type of ILD material. Optionally, the MOL dielectric layer(s) 150, 250, 350 can further include a relatively thin additional dielectric layer 119, 219, 319 (discussed in greater detail below), which is layered between the sensing element 120, 220, 320 and the ILD material layer(s).

One or more first interconnects 199, 299, 399 (also referred to herein as MOL contacts) can extend vertically through the first dielectric layer 155, 255, 355 from one or more terminal(s), respectively, of the sensing element 120, 220, 320 to the top surface of the first dielectric layer 155, 255, 355. Those skilled in the art will recognize that the placement of MOL contact(s) relative to the sensing element will vary depending upon the type of sensing element and its particular configuration (e.g., as discussed in greater detail below with regard to the semiconductor structures 200.1a-200.3b of FIGS. 2.1a-2.3b and 300.1a-300.3b of FIGS. 3.1a-3.3b).

The semiconductor structure 100.1a-100.3b, 200.1a-200.3b, and 300.1a-300.3b can further include BEOL dielectric layers 160 including one or more BEOL dielectric layers of a first metal (M1) level and, optionally, one or more additional BEOL dielectric layers for each of any additional metal (M+) level(s) above the M1 level.

For example, in the semiconductor structure 100.1a-100.2b of FIGS. 1.1a-1.2b, 200.1a-200.2b of FIGS. 2.1a-2.2b, and 300.1a-300.2b of FIGS. 3.1a-3.2b, the BEOL dielectric layers 160, 260, 360 can include at least: a second dielectric layer 159, 259, 359 on the first dielectric layer 155, 255, 355; a third dielectric layer 165, 265, 365 on the second dielectric layer 159, 259, 359; a fourth dielectric layer 169, 269, 369 on the third dielectric layer 165, 265, 365; and a fifth dielectric layer 175, 275, 375 on the fourth dielectric layer 169, 269, 369. The second dielectric layer 159, 259, 359 and the fourth dielectric layer 169, 269, 369 can each be a relatively thin etchstop layer (e.g., a relatively thin layer of SiN or a layer of some other suitable etchstop material). The third dielectric layer 165, 265, 365 and the fifth dielectric layer 175, 275, 375 can be relatively thick and can each include one or more layers of interlayer dielectric (ILD) material. The ILD material can be, for example, $SiO_2$, doped silicon glass (e.g., phosphosilicate glass (PSG) or borophosphosilicate glass (BPSG)), or any other suitable ILD material. In these embodiments, the semiconductor structure can further include second interconnect(s) 197, 297, 397 (e.g., wires) of the M1 level above and immediately adjacent to the first interconnect(s) 199, 299, 399. Specifically, each second interconnect 197, 297, 397 can extend from immediately adjacent to a corresponding first interconnect up through the second dielectric layer 159, 259, 359 and the third dielectric layer 165, 265, 365 to the fourth dielectric layer 169, 269, 369.

Alternatively, as illustrated in the semiconductor structure 100.3a-100.3b of FIGS. 1.3a-1.3b, 200.3a-200.3b of FIGS. 2.3a-2.3b, and 300.3a-300.3b of FIGS. 3.3a-3.3b, the BEOL dielectric layers 160, 260, 360 can include at least: a second dielectric layer 164, 264, 364 on the first dielectric layer 155, 255, 355; a third dielectric layer 168, 268, 368 on the second dielectric layer 164, 264, 364; and a fourth dielectric layer 174, 274, 374 on the third dielectric layer 168, 268, 368. In this case, the second dielectric layer 164, 264, 364 and the fourth dielectric layer 174, 274, 374 can each include one or more layers of interlayer dielectric (ILD) material (as discussed above) and the third dielectric layer 168, 268, 368 is a relative thin etchstop layer but there is no thin etchstop layer between the first dielectric layer 155 of the MOL dielectrics 150 and the relatively thick ILD material of the second dielectric layer 164, 264, 364 above. In these embodiments, the semiconductor structure can similarly include second interconnect(s) 197, 297, 397 (e.g., wires) of the M1 level above and immediately adjacent to the first interconnect(s) 199, 299, 399. In this case, each second interconnect 197, 297, 397 can extend from immediately adjacent to a corresponding first interconnect up through the second dielectric layer 164, 264, 364 to the third dielectric layer 168, 268, 368.

The semiconductor structure 100.1a-100.3b of FIGS. 1.1a-1.3b, 200.1a-200.3b of FIGS. 2.1a-2.3b, and 300.1a-300.3b of FIGS. 3.1a-3.3b can further include, on the frontside 112, 212, 312, a cavity 180.1-180.3, 280.1-280.3, 380.1-380.3 (also referred to herein as a reservoir or air-gap) adjacent to the sensing element 120, 220, 320 and an inlet/outlet portion 185.1-185.3, 285.1-285.3, 385.1-385.3 to the cavity. The inlet/output port and cavity can be configured for conveying a sample 189, 289, 389 (also referred to herein as a test sample) toward the sensing element 120, 220, 320. Specifically, the sample 189, 289, 389 can be a flowable sample such as, for example, a fluid (as shown) or a gas. The cavity 180.1-180.3, 280.1-280.3, 380.1-380.3 and the inlet/output port 185.1-185.3, 285.1-285.3, 385.1-385.3 can be configured to enable the sample 189, 289, 389 to flow from outside the semiconductor structure through the inlet/output portion and into the cavity so that it is adjacent to the sensing element during a sensing operation. As discussed in greater detail below, the specific locations of the cavity and the inlet/outlet port on the frontside within the MOL and BEOL dielectric layers are the same in some embodiments and different in others.

For example, the specific locations of the cavity 180.1, 280.1, 380.1 and the inlet/output port 185.1, 285.1, 385.1 in the semiconductor structures 100.1a-100.1b of FIGS. 1.1a-1.1b, 200.1a-200.1b of FIGS. 2.1a-2.1b, and 300.1a-300.1b of FIGS. 3.1a-3.1b are essentially the same, but different from the various other embodiments. The specific locations of the cavity 180.2, 280.2, 380.2 and the inlet/output portion 185.2, 285.2, 385.2 in the semiconductor structures 100.2a-100.2b of FIGS. 1.2a-1.2b, 200.2a-200.2b of FIGS. 2.2a-2.2b, and 300.2a-300.2b of FIGS. 3.2a-3.2b are essentially the same, but different from the various other embodiments. The specific locations of the cavity 180.3, 280.3, 380.3 and the inlet/output portion 185.3, 285.3, 385.3 in the semiconductor structures 100.3a-100.3b of FIGS. 1.3a-1.3b, 200.3a and 200.3b of FIGS. 2.3a-2.3b, and 300.3a and 300.3b of FIGS. 3.3a-3.3b are essentially the same, but different from the various other embodiments.

Specifically, in the semiconductor structure 100.1a-100.1b of FIGS. 1.1a-1.1b, 200.1a-200.1b of FIGS. 2.1a-2.1b, and 300.1a-300.1b of FIGS. 3.1a-3.1b, the cavity 180.1, 280.1, 380.1 can be within the first dielectric layer 155, 255, 355 between the sensing element 120, 220, 320 and the second dielectric layer 159, 259, 359 such that it is essentially confined with MOL dielectric layer(s) 150, 250, 350 and positioned laterally adjacent to, but physically separated from one or more first interconnects 199, 299, 399

(i.e., MOL contacts). Depending upon the type of sensing element and/or the presence or absence of the thin additional dielectric layer 119, 219, 319, the cavity 180.1, 280.1, 380 may extend to the sensing element 120, 220, 320 or, alternatively, may be physically separated from the sensing element 120, 220, 320 by the thin additional dielectric layer 119, 219, 319. Furthermore, the cavity 180.1, 280.1, 380.1 can optionally be partially or fully lined with a relative thin dielectric liner 124, 224, 324 (e.g., see the semiconductor structure 100.1b of FIG. 1.1b, 200.1b of FIG. 2.1b, and 300.1b of FIG. 3.1b). Additionally, the dielectric liner 124, 224, 324 could be made of the same dielectric material as the additional dielectric layer 119, 219, 319 (if present) or some different dielectric material. In the semiconductor structure 100.1a-100.1b, 200.1a-200.1b, 300.1a-300.1b, the inlet/output port 185.1, 285.1, 385.1 can extend vertically upwards from the cavity 180.1, 280.1, 380.1 to the topmost surface 179, 279, 379 (i.e., the external surface) of the BEOL dielectric layers 160, 260, 360. It should be noted that, due to processing, the structure can also include an opening 184, 284, 384 that extends vertically through the second dielectric layer 159, 259, 359 from the cavity and that is capped by the third dielectric layer 165, 265, 365.

In the semiconductor structure 100.2a-100.2b of FIGS. 1.2a-1.2b, 200.2a-200.2b of FIGS. 2.2a-2.2b, and 300.2a-300.2b of FIGS. 3.2a-3.2b, the cavity 180.2, 280.2, 380.2 can include a first section 181, 281, 381 and a second section 182, 282, 382. The first section 181, 281, 381 can be within the first dielectric layer 155, 255, 355 between the sensing element 120, 220, 320 and the second dielectric layer 159, 259, 359 (i.e., essentially contained within the MOL dielectric layer(s) 150, 250, 350) and positioned laterally adjacent to, but physically separated from, one or more first interconnects 199, 299, 399 (i.e., MOL contacts). Depending upon the type of sensing element and the presence or absence of the thin additional dielectric layer 119, 219, 319, the first section 181, 281, 381 may extend to the sensing element 120, 220, 320 or, alternatively, may be physically separated from the sensing element 120, 220, 320 by the thin additional dielectric layer 119, 219, 319. The second section 182, 282, 382 can be within the third dielectric layer 165, 265, 365 between the second dielectric layer 159, 259, 359 and the fourth dielectric layer 169, 269, 369 and, more particularly, within BEOL dielectric layer(s) 160 at the M1 level. A connecting duct 183, 283, 383 can extend vertically through the second dielectric layer 159, 259, 359 (which effectively functions as an etchstop divider) between the first and second sections (i.e., to link the first and second sections). That is, the connecting duct 183, 283, 383 allows a sample 189, 289, 389 that flows into the second section of the cavity from the inlet/outlet port to further flow into the first section of the cavity so as to be adjacent to the sensing element. The cavity 180.2, 280.2, 380.2 can optionally be partially or fully lined with a relative thin dielectric liner 124, 224, 324 (e.g., see the semiconductor structure 100.2b of FIG. 1.2b, 200.2b of FIG. 2.2b, and 300.2b of FIG. 3.2b). Additionally, the dielectric liner 124, 224, 324 could be made of the same dielectric material as the additional dielectric layer 119, 219, 319 (if present) or some different dielectric material. In the semiconductor structure 100.2a-100.2b, 200.2a-200.2b, and 300.2a-300.2b, the inlet/output port 185.2, 285.2, 385.2 can extend vertically upward from the second section 182, 282, 382 to the topmost surface 179, 279, 379 (i.e., the external surface) of the BEOL dielectric layers 160, 260, 360. It should be noted that, due to processing, the structure can also include an opening 184, 284, 384 that extends vertically through the fourth dielectric layer 169, 269, 369 from the second section 182, 282, 382 and that is capped by the fifth dielectric layer 175, 275, 375.

In the semiconductor structure 100.3a-100.3b of FIGS. 1.3a-1.3b, 200.3a-200.3b of FIGS. 2.3a-2.3b, and 300.3a-300.3b of FIGS. 3.3a-3.3b, the cavity 180.3, 280.3, 380.3 can have a lower portion, which is within the first dielectric layer 155, 255, 355, and an upper portion, which is continuous with the lower portion, and which is within the second dielectric layer 164, 264, 364. Thus, the cavity 180.3, 280.3, 380.3 extends between the sensing element 120, 220, 320 and the third dielectric layer 168, 268, 368 and is positioned laterally adjacent to, but physically separated from, one or more first interconnects 199, 299, 399 (i.e., MOL contacts) and one or more second interconnects 197, 297, 397 (i.e., wires) thereon. Depending upon the type of sensing element and the presence or absence of the thin additional dielectric layer 119, 219, 319, the cavity 180.3, 280.3, 380.3 may extend to the sensing element 120, 220, 320 or, alternatively, may be physically separated from the sensing element 120, 220, 320 by the thin additional dielectric layer 119, 219, 319. Furthermore, the cavity 180.3, 280.3, 380.3 can optionally be partially or fully lined with a relative thin dielectric liner 124, 224, 324 (e.g., see the semiconductor structure 100.3b of FIG. 1.3b, 200.3b of FIG. 2.3b, and 300.3b of FIG. 3.3b). Additionally, the dielectric liner 124, 224, 324 could be made of the same dielectric material as the additional dielectric layer 119, 219, 319 (if present) or some different dielectric material. In the semiconductor structure 100.3a-100.3b, 200.3a-200.3b, 300.3a-300.3b, the inlet/output port 185.3, 285.3, 385.3 can extend vertically upward from the cavity 180.3, 280.3, 380.3 to the topmost surface 179, 279, 379 (i.e., the external surface) of the BEOL dielectric layers 160, 260, 360. It should be noted that, due to processing, the structure can also include an opening 184, 284, 384 that extends vertically through the third dielectric layer 168, 268, 368 from cavity and that is capped by the fifth dielectric layer 175, 275, 375.

As mentioned above, the sensing element of the LOC sensor in the disclosed semiconductor structure embodiments can include, for example, a photodetector-type sensing elements, field effect transistor (FET)-type sensing elements, such as biosensor FET-type sensing elements or ion-sensitive FET-type sensing elements, or any other type of sensing element suitable for use in testing a sample (also referred to herein as a test sample), as discussed in greater detail below. It should therefore be noted that the additional dielectric layer 119, 219, 319 and/or the dielectric liner 124, 224, 324 (if present) could have particular functions depending upon the type of sensing element and the particular dielectric materials used for the additional dielectric layer 119, 219, 319 and/or the dielectric liner 124, 224, 324 (again if present) can vary depending upon those particular functions. For example, the additional dielectric layer could be a relatively thin conformal etchstop layer (e.g., a thin layer of silicon nitride (SiN) or a thin layer of some other suitable etchstop material) on any type of sensing element. The dielectric liner 124, 224, 324 could be a relatively dielectric protective layer (e.g., a thin layer of silicon dioxide, silicon oxynitride, etc. or some other suitable protective layer) lining the cavity adjacent to any type of sensing element. Alternatively, in embodiments where the sensing element is a FET-type sensing element, the additional dielectric layer and/or the dielectric liner could include one or more layers of gate dielectric material to form part of a gate structure of the FET-type sensing element. The layer(s) of gate dielectric material for the additional dielectric layer and/or the dielectric liner could include, for example, silicon dioxide ($SiO_2$)

and/or some other suitable gate dielectric material, such as a high-K gate dielectric material (i.e., a dielectric material with a dielectric constant that is greater than 3.9). Illustrative high-K gate dielectric materials include, but are not limited to, hafnium (HO-based dielectrics (e.g., hafnium oxide, hafnium silicon oxide, hafnium silicon oxynitride, or hafnium aluminum oxide), aluminum oxide, tantalum oxide, or zirconium oxide.

Referring specifically to FIGS. 2.1a-2.3b, in these semiconductor structure embodiments the sensing element 220 is shown as being a photodetector-type sensing element. The photodetector-type sensing element could be a PIN photodiode. The PIN photodiode can include an active device region (e.g., in the semiconductor layer 204 and defined by STI regions 205). Within the active semiconductor region, the PIN photodiode could include a P-type semiconductor region 225, such as a P-type Si region, with a relatively shallow P+ contact region 226 at the top surface; an N-type semiconductor region 222, such as an N-type Si region, with a relatively shallow N+ contact region 221 at the top surface; and an intrinsic semiconductor region (e.g., an undoped semiconductor region), which is also referred to as an absorption region 227, positioned between the P-type semiconductor region 225 and the N-type semiconductor region 222. Since germanium (Ge) has a significantly higher absorption coefficient than Si, Ge or silicon germanium (SiGe) can be used as the primary material within the absorption region 227 such that the PIN photodiode is referred to as a Ge PIN photodiode.

In one illustrative process flow for forming a lateral Ge PIN photodiode, a center portion of the semiconductor layer 204 within the active device region between a P-type semiconductor region 225 and an N-type semiconductor region 222 can be recessed, leaving a thin semiconductor portion 223 therebetween. This thin semiconductor portion 223 can be intrinsic (i.e., undoped). Then, an intrinsic Ge or SiGe layer for the absorption region 227 can be epitaxially grown on the thin semiconductor portion 223. The PIN photodiode can be covered by a relatively thin additional dielectric layer 219 (e.g., a thin conformal etchstop layer, such as a thin conformal SiN etchstop layer) and a blanket dielectric layer 255 (e.g., a blanket $SiO_2$ layer) can be formed on the additional dielectric layer 219. First interconnects 299 (and, particularly, MOL contacts) can be formed such that they extend through the ILD layers to the PIN photodiode and can include, for example, an anode contact on the P+ contact region 226 and a cathode contact on the N+ contact regions 221. In this structure, a sample 289 (e.g., a fluid or gas) that flows through the inlet/output port 285.1-285.3 and into the cavity 280.1-280.3 is illuminable (i.e., it can be illuminated by a light source 295 while in the cavity).

In a sensing operation using the LOC sensor with the photodetector-type sensing element 220, changes in current flow through the PIN photodiode in response to illumination of the sample 289 can be monitored in order to, for example, detect a target (e.g., an analyte, component, or chemical species, acidity/alkalinity, etc.) in the sample 289 and, optionally, to characterize the target (e.g., measure the concentration of the target, indicate pH level, etc.). It should be noted that the illustrative lateral PIN photodiode shown in FIGS. 2.1a-2.3b is provided for illustration purposes and is not intended to be limiting. Alternatively, the photodetector-type sensing element 220 could be a lateral PN diode, a lateral avalanche diode, or a photodiode with some other suitable configuration. For example, the photodiode could be a vertically oriented photodiode as opposed to a lateral photodiode.

Referring specifically to FIGS. 3.1a-3.3b, in these semiconductor structure embodiments the sensing element 320 is shown as being a FET-type sensing element. The FET-type sensing element can include an active device region (e.g., in the semiconductor layer 304 and defined by STI regions 305). Within the active semiconductor region, the FET-type sensing element could include a channel region 323 with a first-type conductivity at a relatively low conductivity level and positioned laterally between source/drain regions 322 with a second-type conductivity at a relatively high conductivity level. For example, for an NFET-type sensing element, the channel region 323 could be a P-channel region and the source/drain regions 322 could be N+ source/drain regions, whereas for a PFET-type sensing element, the channel region 323 could be an N-channel region and the source/drain regions 322 could be P+ source/drain regions. First interconnects 399 (and, particularly, MOL contacts) can extend through the ILD layers to the source/drain regions 322.

The FET-type sensing element can further include a gate structure including a gate dielectric adjacent to the channel region 323 and a gate conductor adjacent to the gate dielectric. As shown in FIGS. 3.1a, 3.2a, and 3.3a, in some embodiments, the active semiconductor region can be covered by a relatively thin additional dielectric layer 319 (which in this case is a gate dielectric layer), the first dielectric layer 355 is on the gate dielectric layer 319, and the cavity 380.1-380.3 can extend to the gate dielectric layer so that the gate dielectric layer is exposed to the sample 389 (e.g., a fluid or a gas) within the cavity and so that the gate dielectric layer separates the channel region 323 from the sample 389. As shown in FIGS. 3.1b, 3.2b, and 3.3b, in other embodiments, the active semiconductor region can be covered by the first dielectric layer 355 and the cavity 380.1-380.3 can extend to the channel region 323. In this case, the cavity 380.1, 380.2 and 380.3 can be lined (or at least the bottom surface of the cavity can be lined) with a relatively thin dielectric liner 324 (i.e., a gate dielectric layer, as discussed above) that separates the channel region 323 from the sample 389. It should be understood that the figures are not intended to be limiting and that, alternatively, the channel region 323 could be separated from the sample, 389 by both the additional dielectric layer 319 and the dielectric liner 324 that lines the cavity. Additionally, the sample 389 can be biasable within the cavity 380.1-380.3. That is, one or more electrodes (not shown) can extend into the cavity to the sample 380 so that a particular gate voltage can be applied to the sample 389. Thus, in this FET-type sensing element, the additional dielectric layer 319 and/or the dielectric liner 324 is the gate dielectric of the gate structure and the sample 389 is the gate conductor.

In a sensing operation using the LOC sensor with the FET-type sensing element 220, changes in current flow through the FET and, particularly, through the channel region 323 between the source/drain regions 322 in response to biasing of the sample 389 can be monitored in order to, for example, detect a target (e.g., an analyte, component, or chemical species, acidity/alkalinity, etc.) in the sample 389 and, optionally, to characterize the target (e.g., measure the concentration of the target, indicate pH level, etc.).

As mentioned above, a FET-type sensing element could be a biosensor FET-type sensing elements or ion-sensitive FET-type sensing elements. In such FET-type sensing elements, the exposed gate dielectric surface within the cavity can, optionally, be functionalized. That is, within the cavity, the exposed surface of the gate dielectric material within the cavity can, due to specific processing performed during manufacturing, contain specific molecular receptors for a target analyte. For example, in the case of a bioFET, the exposed surface of the gate dielectric material within the cavity can include specific bioreceptors for a bioanalyte.

FIG. 4 is a flow diagram illustrating method embodiments for forming the above-described semiconductor structures and, particularly, the semiconductor structures 100.1a-100.3b of FIGS. 1.1a-1.3b, respectively. The method can include forming a partially completed semiconductor structure (e.g., either a partially completed semiconductor-on-insulator structure, as illustrated, or a partially completed bulk semiconductor structure including a sensing element 120 on a frontside 112 of a semiconductor substrate 101 (see process 402, see FIG. 5). Such a sensing element can be, for example, a photodetector-type sensing element, a field effect transistor (FET)-type sensing element, such as biosensor FET-type sensing elements or ion-sensitive FET-type sensing elements, or any other type of sensing element suitable for use in testing a sample (also referred to herein as a test sample). The sample can specifically be a flowable sample (e.g., a fluid or a gas). Techniques for forming such sensing elements (except for the novel aspects of the disclosed embodiments for the frontside port and cavity configurations) are well known in the art and, thus, the details thereof have been omitted from the specification in order to allow the reader to focus on the salient aspects of the disclosed embodiments.

Figure 5:
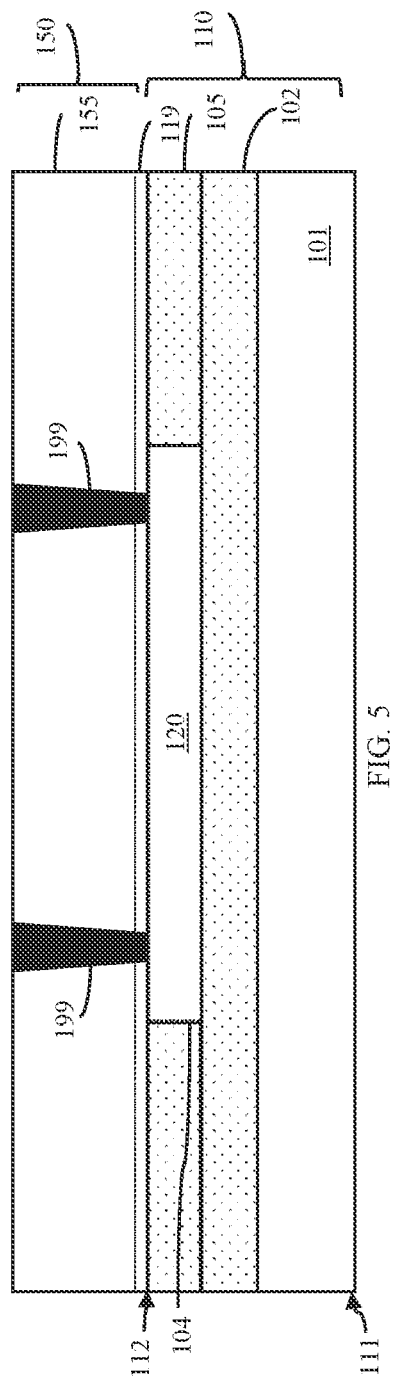
FIG. 5 is a cross-section diagram illustrating a partially completed semiconductor structure formed according to the flow diagram of FIG. 4.
Figure 6C:
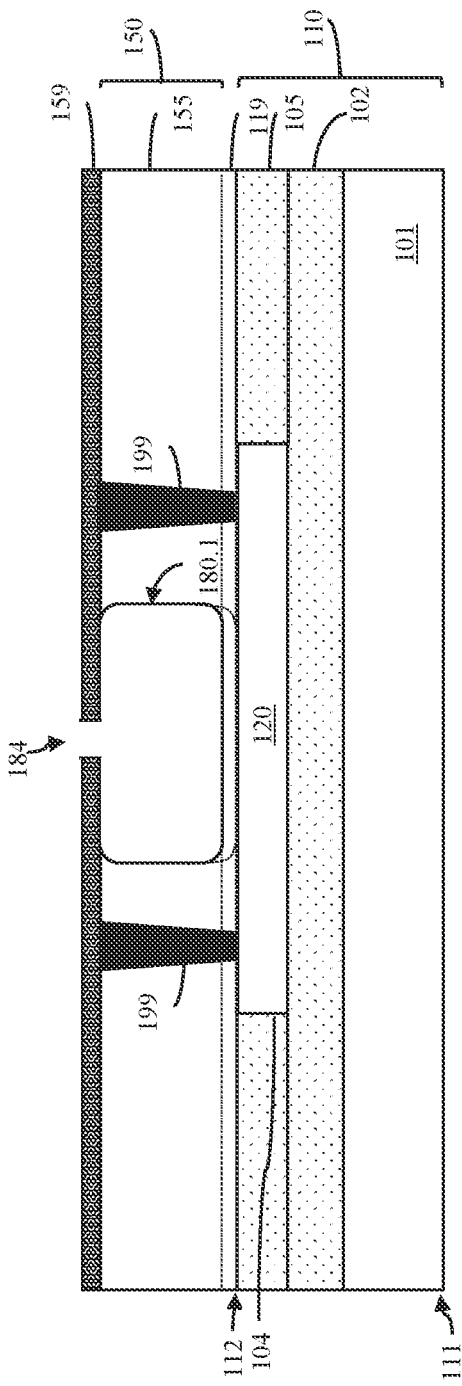
Figure 6D:
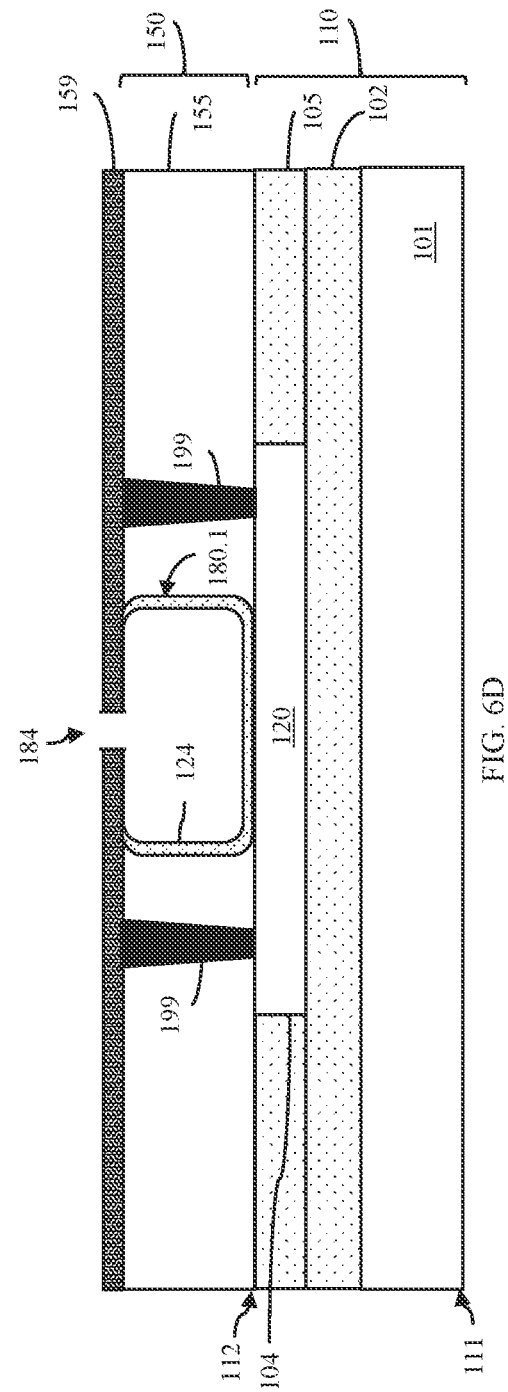
Figure 7A:
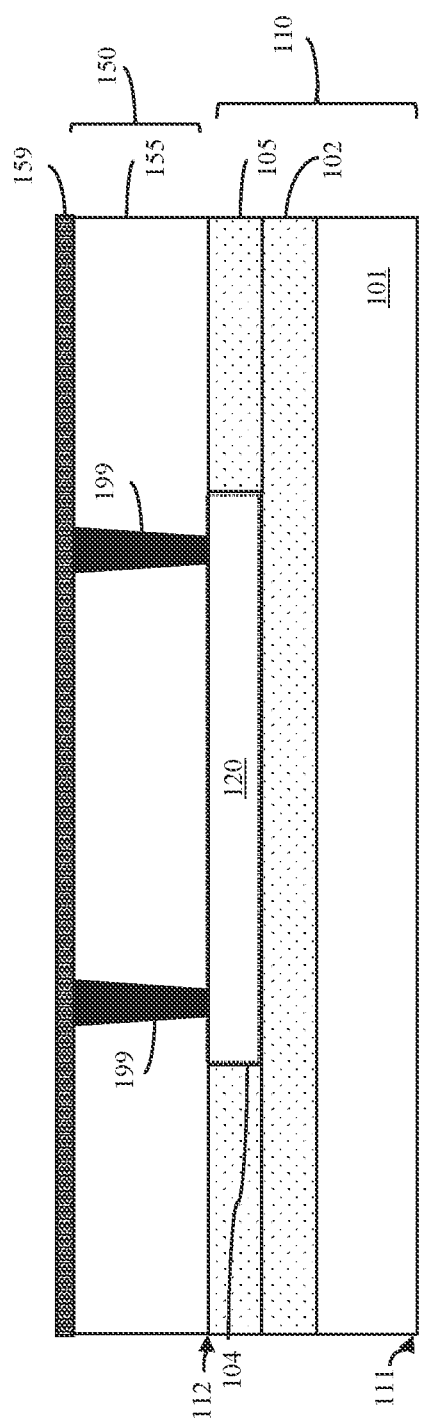
Figure 7B:
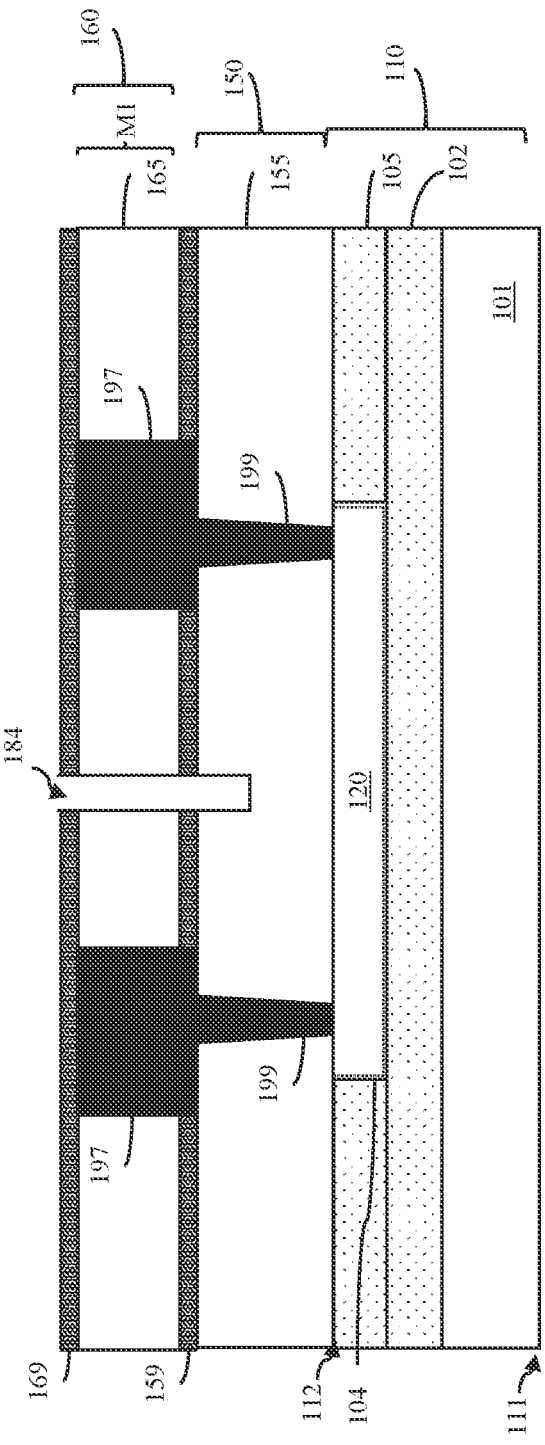
Figure 8E:
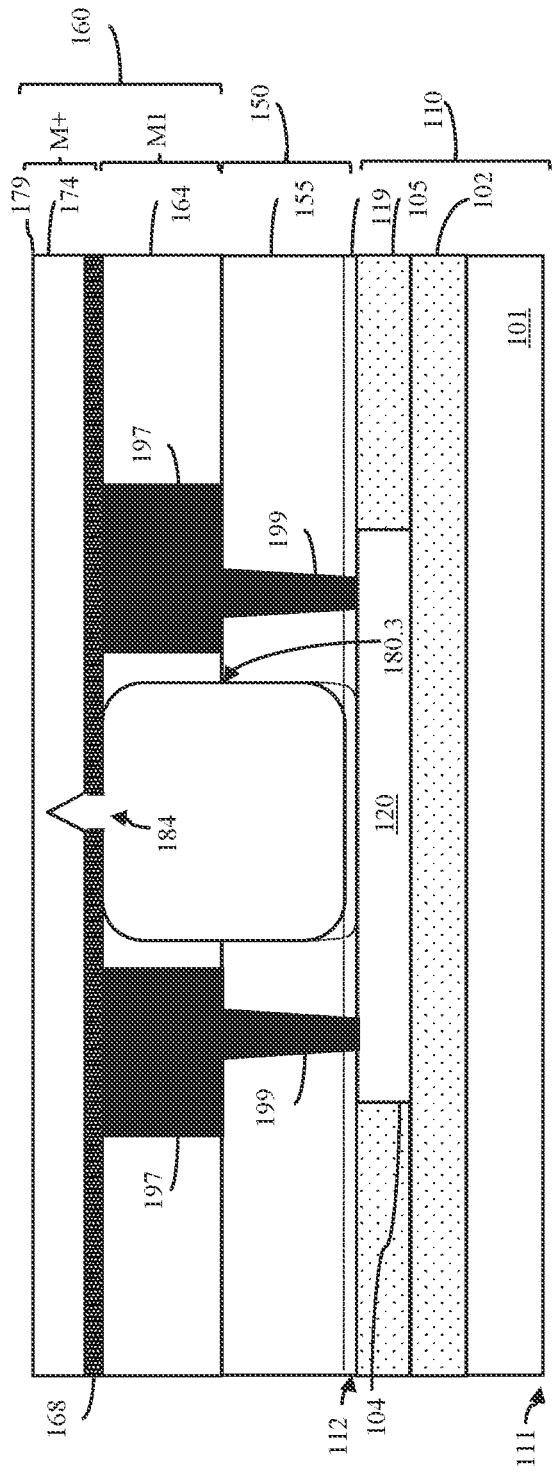
Figure 8F:
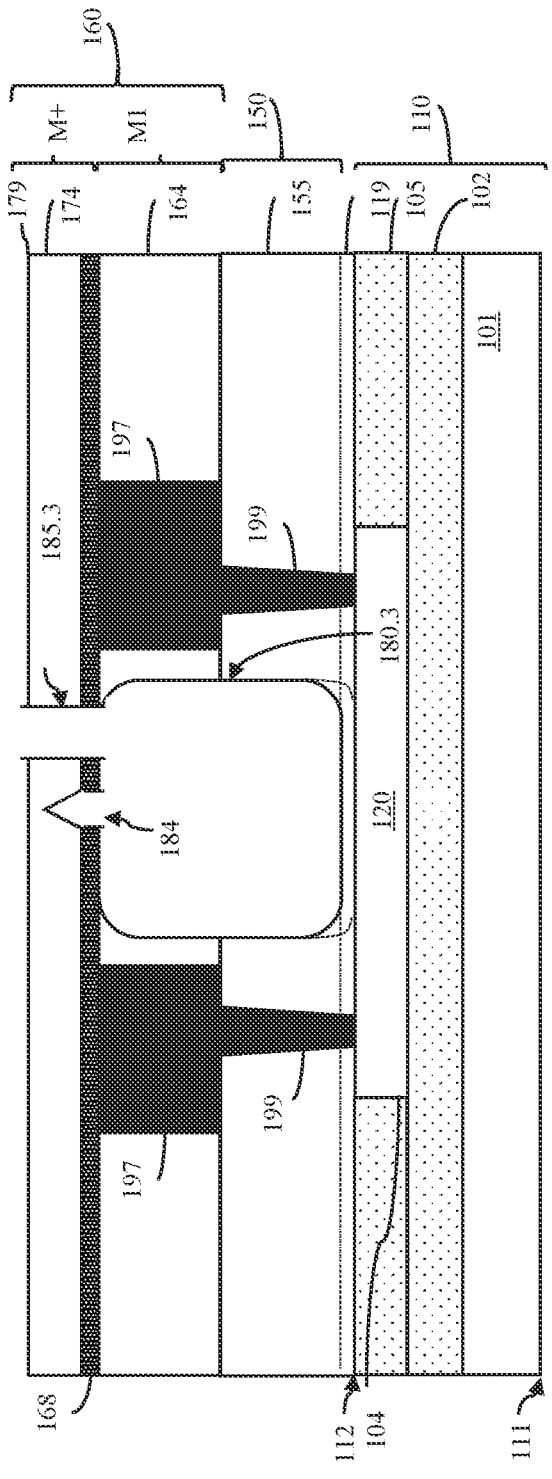

The method can further include forming an optional additional dielectric layer 119 over the sensing element 120 and then forming a first dielectric layer 155 thereon (see processes 404-406 and FIG. 5). As discussed in greater detail above with regard to the structure embodiments, the additional dielectric layer 119 could be a relatively thin etchstop layer or, alternatively, a gate dielectric layer. As discussed in greater detail above with regard to the structure embodiments the first dielectric layer 155 can include MOL dielectric layers 150 including one or more layers of inter-layer dielectric (ILD) material. One or more first interconnects 199 and, particularly, one or more MOL contacts can then be formed that extend essentially vertically through the first dielectric layer 155 to the sensing element 120 (see process 408 and FIG. 5). Techniques for forming contacts are well known in the art and, thus, the details thereof have been omitted from this specification in order to allow the reader to focus on the salient aspects of the disclosed embodiments.

Processes 412-418 refer specifically to Process Flow 1 for forming the semiconductor structure 100.1a-100.1b of FIGS. 1.1a-1.1b and are illustrated in FIGS. 6A-6F. Specifically, a second dielectric layer 159 (e.g., a relatively thin etchstop layer) can be formed on the first dielectric layer 155 (see process 412 and FIG. 6A). Then, a relatively small opening 184 can be formed (e.g., lithographically patterned and anisotropically etched) to expose the first dielectric layer 155 and a selective isotropic etch process can be performed in order to form a cavity 180.1 within the first dielectric layer 155 such that it is positioned vertically between the sensing element 120 and the second dielectric layer 159 and positioned laterally adjacent to, but physically separated from, at least one first interconnect 199 (see process 414 and FIG. 6C). Depending upon the presence of the optional additional dielectric layer 119, the cavity 180.1 may or may not expose a top surface of the sensing element 120. Optionally, a dielectric liner 124 can be formed to line the cavity 180.1 at least partially (see FIG. 6D). As discussed in greater detail above with regard to the structure embodiments, this dielectric liner 124 can be a protective dielectric layer. Alternatively, if the sensing element 120 is a FET-type sensing element, the dielectric liner 124 can be a gate dielectric layer. Optionally, in the case of a FET-type sensing element, the exposed surface of gate dielectric material (e.g., either the additional dielectric layer 119 or the dielectric liner 124) could be further processed so that it becomes functionalized. That is, it can be processed so that it contains specific molecular receptors for a target analyte. For example, in the case of a bioFET, the exposed surface can be processed so it contains specific bioreceptors for a bioanalyte. The remaining processes of Process Flow 1 can be performed with respect to the partially completed structure shown in FIG. 6C to form the semiconductor structure 100.1a of FIG. 1.1a or with respect to the partially completed structure shown in FIG. 6D to form the semiconductor structure 100.1b of FIG. 1.1b. For purposes of illustration, the remaining processes of Process Flow 1 are illustrated in the figures and described below with respect to the partially completed structure shown in FIG. 6C. A third dielectric layer 165 (e.g., one or more layers of ILD material) can be formed on the second dielectric layer 159, capping the opening 184 (see process 416 and FIG. 6E). One or more second interconnects 197 (e.g., one or more wires) can be formed on the first interconnect(s) 199, respectively, in the second dielectric layer 159 and the third dielectric layer 165 (see process 418 and FIG. 6E). Additional BEOL dielectric layers (e.g., see fourth and fifth dielectric layers 169 and 175) can be stacked on the partially completed structure and an inlet/outlet portion 185.1 can be formed (e.g., lithographically patterned and etched) such that it extends from the topmost surface 179 of the BEOL dielectric layers 160 down to the cavity (see processes 440-442 and FIG. 6F).

Processes 422-428 refer specifically to Process Flow 2 for forming the semiconductor structure 100.2a-100.2b of FIGS. 1.2a-1.2b and are illustrated in FIGS. 7A-7F. Specifically, a second dielectric layer 159 (e.g., a relatively thin etchstop layer) can be formed on the first dielectric layer 155 and a third dielectric layer 165 (e.g., one or more layers of ILD material) can be formed on the second dielectric layer (see process 422 and FIG. 7A). One or more second interconnects 197 (e.g., one or more wires) can be formed on the first interconnect(s) 199, respectively, in the second dielectric layer 159 and the third dielectric layer 165 (see process 424 and FIG. 7B). A fourth dielectric layer 169 (e.g., another relatively thin etchstop layer) can be formed on the third dielectric layer 165 (see process 426). Then, a relatively small opening 184 can be formed (e.g., lithographically patterned and anisotropically etched) from the fourth dielectric layer 169 down to the first dielectric layer 155 and a selective isotropic etch process can be performed in order to form a cavity 180.2 with a first section 181 and a second section 182 (see process 428 and FIG. 7C). The first section 181 can be within the first dielectric layer 155 such that it is positioned vertically between the sensing element 120 and the second dielectric layer 159 and positioned laterally adjacent to, but physically separated from, at least one first interconnect 199. The second section 182 can be within the third dielectric layer 165. The remaining portion of the opening 184 used to expose the first dielectric layer at process 428 can function as a connecting duct 183 between the first and second sections 181-183. Depending upon the presence of the optional additional dielectric layer 119, the cavity may or may not expose a top surface of the sensing element 120. Optionally, a dielectric liner 124 can be formed to line the cavity at least partially 180.2 (see FIG. 7D). As discussed in greater detail above with regard to the structure embodiments, this dielectric liner 124 can be a protective dielectric layer. Alternatively, if the sensing element 120 is a FET-type sensing element, the dielectric liner 124 can be a gate dielectric layer. Optionally, in the case of a FET-type sensing element, the exposed surface of gate dielectric material (e.g., either the additional dielectric layer 119 or the dielectric liner 124) could be further processed so that it becomes functionalized. That is, it can be processed so that it contains specific molecular receptors for a target analyte. For example, in the case of a bioFET, the exposed surface can be processed so it contains specific bioreceptors for a bioanalyte. The remaining processes of Process Flow 2 can be performed with respect to the partially completed structure shown in FIG. 7C to form the semiconductor structure 100.2a of FIG. 1.2a or with respect to the partially completed structure shown in FIG. 7D to form the semiconductor structure 100.2b of FIG. 1.2b. For purposes of illustration, the remaining processes of Process Flow 2 are illustrated in the figures and described below with respect to the partially completed structure shown in FIG. 7C. One or more additional BEOL dielectric layers (e.g., see the fifth dielectric layer 175) can be stacked on the partially completed structure and an inlet/outlet portion 185.2 can be formed (e.g., lithographically patterned and anisotropically etched) such that it extends from the topmost surface 179 of the BEOL dielectric layers 160 down to the cavity (see processes 440-442 and FIGS. 7E-7F).

Processes 432-438 refer specifically to Process Flow 3 for forming the semiconductor structure 100.3a-100.3b of FIG. 1.3a-1.3b and are illustrated in FIGS. 8A-8F. Specifically, a second dielectric layer 164 (e.g., one or more layers of ILD material) can be formed directly on the first dielectric layer 155 (see process 432 and FIG. 8A). One or more second interconnects 197 (e.g., one or more wires) can be formed on the first interconnect(s) 199, respectively, in the second dielectric layer 164 (see process 434). A third dielectric layer 168 (e.g., another relatively thin etchstop layer) can be formed on the second dielectric layer 164 (see process 436). Then, a relatively small opening 184 can be formed (e.g., lithographically patterned and anisotropically etched) through the third dielectric layer 168 to the second dielectric layer 164 and a selective isotropic etch process can be performed in order to form a cavity 180.3 with a first portion in the first dielectric layer 155 and a second portion in the second dielectric layer 164 (see process 438 and FIGS. 8B-8C). The first and second portions can be continuous with the first portion being positioned laterally adjacent to, but physically separated from, at least one first interconnect 199 and the second portion being positioned laterally adjacent to, but physically separated from, a second interconnect 197 on the first interconnect 199. Depending upon the presence of the optional additional dielectric layer 119, the cavity may or may not expose a top surface of the sensing element 120. Optionally, a dielectric liner 124 can be formed to line the cavity at least partially 180.3 (see FIG. 8D). As discussed in greater detail above with regard to the structure embodiments, this dielectric liner 124 can be a protective dielectric layer. Alternatively, if the sensing element 120 is a FET-type sensing element, the dielectric liner 124 can be a gate dielectric layer. Optionally, in the case of a FET-type sensing element, the exposed surface of gate dielectric material (e.g., either the additional dielectric layer 119 or the dielectric liner 124) could be further processed so that it becomes functionalized. That is, it can be processed so that it contains specific molecular receptors for a target analyte. For example, in the case of a bioFET, the exposed surface can be processed so it contains specific bioreceptors for a bioanalyte. The remaining processes of Process Flow 3 can be performed with respect to the partially completed structure shown in FIG. 8C to form the semiconductor structure 100.3a of FIG. 1.3a or with respect to the partially completed structure shown in FIG. 8D to form the semiconductor structure 100.3b of FIG. 1.3b. For purposes of illustration, the remaining processes of Process Flow 3 are illustrated in the figures and described below with respect to the partially completed structure shown in FIG. 8C. One or more additional BEOL dielectric layers can be stacked on the partially completed structure (e.g., see the fourth dielectric layer 174 capping the opening 184) and an inlet/outlet portion 185.3 can be formed (e.g., lithographically patterned and anisotropically etched) such that it extends from the topmost surface 179 of the BEOL dielectric layers 160 down to the cavity 180.3 (see processes 440-442 and FIGS. 8E-8F).

It should be understood that in the structures and method described above, a semiconductor material refers to a material whose conducting properties can be altered by doping with an impurity. Semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region. Furthermore, when a semiconductor region or layer is described as being at a higher conductivity level than another semiconductor region or layer, it is more conductive (less resistive) than the other semiconductor region or layer; whereas, when a semiconductor region or layer is described as being at a lower conductivity level than another semiconductor region or layer, it is less conductive (more resistive) than that other semiconductor region or layer.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, terms such as "comprises", "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first dielectric layer on a sensing element;
   a second dielectric layer on the first dielectric layer, wherein a cavity is within the first dielectric layer between the sensing element and the second dielectric layer;
   a third dielectric layer on the second dielectric layer;
   a fourth dielectric layer on the third dielectric layer;
   a first interconnect on the sensing element; and
   a second interconnect on the first interconnect, wherein the first interconnect extends from the sensing element through the first dielectric layer to the second interconnect,
   wherein the second interconnect extends from the first interconnect through the second dielectric layer and the third dielectric layer to the fourth dielectric layer, and
   wherein a port extends from the cavity at least through the second dielectric layer, the third dielectric layer and the fourth dielectric layer.

2. The structure of claim 1, wherein the port and the cavity enable a sample to flow toward the sensing element.

3. The structure of claim 1, further comprising an additional dielectric layer between the sensing element and the first dielectric layer, wherein the cavity extends from the additional dielectric layer to the second dielectric layer.

4. The structure of claim 1, wherein the cavity extends from the sensing element to the second dielectric layer.

5. The structure of claim 1, further comprising a dielectric liner lining at least a bottom of the cavity.

6. The structure of claim 1, wherein the sensing element comprises a photodetector and wherein the sample is illuminable within the cavity.

7. The structure of claim 1,
   wherein the sensing element comprises a semiconductor region of a field effect transistor,
   wherein the semiconductor region comprises source/drain regions and a channel region between the source/drain regions,
   wherein the cavity is adjacent to the channel region, and
   wherein the field effect transistor further comprises a gate structure comprising:
      an additional dielectric layer; and
      the sample within the cavity, wherein the sample is biasable and separated from the channel region by the additional dielectric layer.

8. A structure comprising:
   a first dielectric layer on a sensing element;
   a second dielectric layer on the first dielectric layer;
   a third dielectric layer on the second dielectric layer;
   a fourth dielectric layer on the third dielectric layer, wherein a cavity has a first section within the first dielectric layer between the sensing element and the second dielectric layer, a second section in the third dielectric layer between the second dielectric layer and the fourth dielectric layer and a connecting duct extending through the third dielectric layer from the first section to the second section;
   a fifth dielectric layer on the fourth dielectric layer;
   a first interconnect on the sensing element; and
   a second interconnect on the first interconnect,
   wherein the first interconnect extends from the sensing element through the first dielectric layer to the second interconnect, wherein the second interconnect extends from the first interconnect through the second dielectric layer and the third dielectric layer to the fourth dielectric layer, and wherein a port extends from the second section of the cavity at least through the fourth dielectric layer and the fifth dielectric layer.

9. The structure of claim 8, wherein the port and the cavity enable a sample to flow toward the sensing element.

10. The structure of claim 8, further comprising an additional dielectric layer between the sensing element and the first dielectric layer, wherein the first section of the cavity extends from the additional dielectric layer to the second dielectric layer.

11. The structure of claim 8, wherein the first section of the cavity extends from the sensing element to the second dielectric layer.

12. The structure of claim 8, further comprising a dielectric liner lining at least a bottom of the cavity.

13. The structure of claim 8, wherein the sensing element comprises any of a photodetector or a semiconductor region of a field effect transistor.

14. A structure comprising:
a first dielectric layer on a sensing element;
a second dielectric layer on the first dielectric layer;
a third dielectric layer on the second dielectric layer, wherein a cavity is within the first dielectric layer and the second dielectric layer between the sensing element and the third dielectric layer;
a fourth dielectric layer on the third dielectric layer;
a first interconnect on the sensing element; and
a second interconnect on the first interconnect,
wherein the first interconnect extends from the sensing element through the first dielectric layer to the second interconnect, wherein the second interconnect extends from the first interconnect through the second dielectric layer to the third dielectric layer, and wherein a port extends from the cavity at least through the third dielectric layer and the fourth dielectric layer.

15. The structure of claim 14, wherein the port and the cavity enable a sample to flow toward the sensing element.

16. The structure of claim 14, further comprising an additional dielectric layer between the sensing element and the first dielectric layer, wherein the cavity extends from the additional dielectric layer to the third dielectric layer.

17. The structure of claim 14, wherein the cavity extends from the sensing element to the third dielectric layer.

18. The structure of claim 14, further comprising a dielectric liner lining at least a bottom of the cavity.

19. The structure of claim 14, wherein the sensing element comprises a photodetector and wherein the sample is illuminable within the cavity.

20. The structure of claim 14,
wherein the sensing element comprises a semiconductor region of a field effect transistor,
wherein the semiconductor region comprises source/drain regions and a channel region between the source/drain regions,
wherein the cavity is adjacent to the channel region, and
wherein the field effect transistor further comprises a gate structure comprising:
an additional dielectric layer; and
the sample within the cavity, wherein the sample is biasable and separated from the channel region by the additional dielectric layer.

* * * * *